US012222068B2

(12) United States Patent
Stradiotto et al.

(10) Patent No.: US 12,222,068 B2
(45) Date of Patent: *Feb. 11, 2025

(54) THERMAL STORAGE IN PRESSURIZED FLUID FOR COMPRESSED AIR ENERGY STORAGE SYSTEMS

(71) Applicant: Hydrostor Inc., Toronto (CA)

(72) Inventors: Daniel Stradiotto, Toronto (CA); Cameron Lewis, Toronto (CA); Davin Young, Toronto (CA); Andrew McGillis, Toronto (CA)

(73) Assignee: Hydrostor Inc., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,933

(22) Filed: Oct. 9, 2023

(65) Prior Publication Data

US 2024/0035621 A1 Feb. 1, 2024

Related U.S. Application Data

(63) Continuation of application No. 18/168,078, filed on Feb. 13, 2023, now Pat. No. 11,821,584, which is a
(Continued)

(51) Int. Cl.
*F17C 1/00* (2006.01)
*B65G 5/00* (2006.01)
(Continued)

(52) U.S. Cl.
CPC ................ *F17C 1/007* (2013.01); *B65G 5/00* (2013.01); *F02C 6/16* (2013.01); *F02C 7/143* (2013.01);
(Continued)

(58) Field of Classification Search
CPC .. F17C 1/007; F17C 5/06; F17C 13/02; F17C 13/06; F17C 2227/0192; F17C 2270/0149;
(Continued)

(56) References Cited

U.S. PATENT DOCUMENTS 1,382,569 A 6/1921 Tait
2,749,714 A 6/1956 Hunter
(Continued)

FOREIGN PATENT DOCUMENTS

AU 2006233241 A1 5/2007
CA 1073223 A 3/1980
(Continued)

OTHER PUBLICATIONS

Wang, J. et al., Overview of Compressed Air Energy Storage and Technology Development; Energies; 2017; 10, 991; 22 pages; http://wrap.warwick.ac.uk/91858/7/WRAP-overview-compressed-air-energy-storage-technology-development-Wang-2017.pdf.
(Continued)

*Primary Examiner* — Kenneth J Hansen
*Assistant Examiner* — Kelsey L Stanek
(74) *Attorney, Agent, or Firm* — Young Basile Hanlon & MacFarlane, P.C.

(57) ABSTRACT

A thermal storage subsystem may include at least a first storage reservoir configured to contain a thermal storage liquid at a storage pressure that is greater than atmospheric pressure. A liquid passage may have an inlet connectable to a thermal storage liquid source and configured to convey the thermal storage liquid to the liquid reservoir. A first heat exchanger may be provided in the liquid inlet passage and may be in fluid communication between the first compression stage and the accumulator, whereby thermal energy can be transferred from a compressed gas stream exiting a gas
(Continued)

compressor/expander subsystem to the thermal storage liquid.

19 Claims, 22 Drawing Sheets

Related U.S. Application Data continuation of application No. 17/526,508, filed on Nov. 15, 2021, now Pat. No. 11,644,150, which is a continuation of application No. 16/492,401, filed as application No. PCT/CA2018/050282 on Mar. 9, 2018, now Pat. No. 11,274,792, which is a continuation of application No. PCT/CA2018/050112, filed on Jan. 31, 2018.

(60) Provisional application No. 62/469,264, filed on Mar. 9, 2017.

(51) Int. Cl.
  *F02C 6/16* (2006.01)
  *F02C 7/143* (2006.01)
  *F03D 9/17* (2016.01)
  *F03D 9/18* (2016.01)
  *F17C 5/06* (2006.01)
  *F17C 13/02* (2006.01)
  *F17C 13/06* (2006.01)
  *F28D 20/00* (2006.01)

(52) U.S. Cl.
  CPC .............. *F03D 9/17* (2016.05); *F03D 9/18* (2016.05); *F17C 5/06* (2013.01); *F17C 13/02* (2013.01); *F17C 13/06* (2013.01); *F28D 20/0034* (2013.01); *F28D 20/0043* (2013.01); *F28D 20/0052* (2013.01); *F05D 2260/42* (2013.01); *F17C 2227/0192* (2013.01); *F17C 2270/0149* (2013.01); *F17C 2270/0581* (2013.01); *Y02E 60/16* (2013.01)

(58) Field of Classification Search
  CPC ...... F17C 2270/0581; F03D 9/17; F03D 9/18; B65G 5/00; F02C 6/16; F02C 7/143; F28D 20/0034; F28D 20/0043; F28D 20/0052; Y02E 60/16; F03G 7/06; F15B 1/04
  USPC .......................................................... 60/659
  See application file for complete search history.

(56) References Cited

U.S. PATENT DOCUMENTS

| | | |
|---|---|---|
| 3,019,854 A | 2/1962 | O'Bryant |
| 3,643,426 A | 2/1972 | Janelid |
| 3,895,493 A | 7/1975 | Rigollot |
| 3,939,356 A | 2/1976 | Loane |
| 3,988,897 A | 11/1976 | Strub |
| 3,996,741 A | 12/1976 | Herberg |
| 4,085,971 A | 4/1978 | Jacoby |
| 4,147,204 A | 4/1979 | Pfenninger |
| 4,150,547 A | 4/1979 | Hobson |
| 4,343,569 A | 8/1982 | Schwarzenbach |
| 4,355,923 A | 10/1982 | Schwarzenbach |
| 4,391,552 A | 7/1983 | O'Hara |
| 4,392,354 A | 7/1983 | Schwarzenbach |
| 4,399,656 A | 8/1983 | Laing et al. |
| 4,403,477 A | 9/1983 | Schwarzenbach |
| 4,450,547 A | 5/1984 | Nakamura et al. |
| 4,454,721 A | 6/1984 | Hurlimann et al. |
| 4,523,432 A | 6/1985 | Frutschi |
| 4,538,414 A | 9/1985 | Saleh |
| 4,727,930 A | 3/1988 | Bruckner et al. |
| 5,634,340 A | 6/1997 | Grennan |
| 6,167,951 B1 | 1/2001 | Couch et al. |
| 6,185,841 B1 | 2/2001 | Conochie |
| 6,467,535 B1 | 10/2002 | Shembekar et al. |
| 6,637,977 B2 | 10/2003 | Hayashi et al. |
| 6,739,522 B2 | 5/2004 | Laumen |
| 7,663,255 B2 | 2/2010 | Kim et al. |
| 7,755,212 B2 | 7/2010 | Enis et al. |
| 8,136,354 B2 | 3/2012 | Havel |
| 8,277,145 B2 | 10/2012 | Dickinson, III et al. |
| 8,663,255 B2 | 3/2014 | Torain et al. |
| 8,739,522 B2 | 6/2014 | Anikhindi et al. |
| 9,045,209 B2 | 6/2015 | Zeren et al. |
| 9,322,296 B2 | 4/2016 | Hugo et al. |
| 9,383,105 B2 | 7/2016 | Naeve |
| 9,404,512 B2 | 8/2016 | Dämgen et al. |
| 9,422,948 B2 | 8/2016 | Kim et al. |
| 9,433,910 B2 | 9/2016 | Wyttenbach et al. |
| 9,739,536 B2 | 8/2017 | Erben et al. |
| 9,777,965 B2 | 10/2017 | Chordia et al. |
| 9,803,603 B2 | 10/2017 | Ganser |
| 9,803,803 B1 | 10/2017 | Adams et al. |
| 10,859,207 B2 | 12/2020 | Lewis et al. |
| 11,274,792 B2 * | 3/2022 | Stradiotto ........... F28D 20/0034 |
| 11,519,393 B2 | 12/2022 | Lewis et al. |
| 11,591,957 B2 | 2/2023 | Howitt |
| 11,644,150 B2 * | 5/2023 | Stradiotto ................. F03D 9/17 60/659 |
| 11,767,950 B2 | 9/2023 | Lewis et al. |
| 11,821,584 B2 * | 11/2023 | Stradiotto ............... F17C 13/02 |
| 11,835,023 B2 * | 12/2023 | Young .................... F03B 13/06 |
| 2003/0021631 A1 * | 1/2003 | Hayashi .................. B65G 5/00 405/52 |
| 2005/0004416 A1 | 1/2005 | Okutsu et al. |
| 2008/0000233 A1 | 1/2008 | Althaus et al. |
| 2010/0218500 A1 | 9/2010 | Ruer |
| 2010/0248500 A1 | 9/2010 | Ting et al. |
| 2011/0094212 A1 | 4/2011 | Ast et al. |
| 2011/0094229 A1 | 4/2011 | Freund et al. |
| 2011/0094231 A1 | 4/2011 | Freund |
| 2011/0094242 A1 | 4/2011 | Koerner |
| 2011/0100010 A1 | 5/2011 | Freund et al. |
| 2011/0296823 A1 | 12/2011 | McBride et al. |
| 2012/0057998 A1 | 3/2012 | Ingersoll et al. |
| 2012/0067047 A1 | 3/2012 | Peterson et al. |
| 2012/0102954 A1 | 5/2012 | Ingersoll et al. |
| 2012/0174569 A1 | 7/2012 | Ingersoll et al. |
| 2012/0297776 A1 | 11/2012 | Bollinger et al. |
| 2013/0061591 A1 * | 3/2013 | Bove ....................... F02C 7/143 60/645 |
| 2014/0013735 A1 | 1/2014 | McBride et al. |
| 2014/0020369 A1 | 1/2014 | Guidati |
| 2015/0000248 A1 * | 1/2015 | del Omo .................. F01K 7/00 60/659 |
| 2015/0015210 A1 | 1/2015 | Bradwell et al. |
| 2015/0019096 A1 | 1/2015 | Kim |
| 2015/0091301 A1 | 4/2015 | Littmann et al. |
| 2015/0114611 A1 | 4/2015 | Morris et al. |
| 2015/0125210 A1 | 5/2015 | Ingersoll et al. |
| 2015/0267612 A1 | 9/2015 | Bannari |
| 2016/0032783 A1 | 2/2016 | Howes et al. |
| 2016/0231072 A1 | 8/2016 | Pohlman |
| 2017/0013867 A1 | 1/2017 | Kelleher et al. |
| 2017/0138674 A1 | 5/2017 | Pourima |
| 2017/0159503 A1 | 6/2017 | Plais et al. |
| 2017/0350658 A1 | 12/2017 | Kerth et al. |
| 2018/0017213 A1 | 1/2018 | Deleau et al. |
| 2018/0094581 A1 | 4/2018 | Teixeira |
| 2018/0179916 A1 | 6/2018 | Larochelle et al. |
| 2018/0313270 A1 | 11/2018 | Jones et al. |
| 2019/0011593 A1 | 1/2019 | Marsala et al. |
| 2019/0346082 A1 | 11/2019 | Lewis et al. |
| 2020/0103178 A1 | 4/2020 | Gerstler et al. |
| 2021/0207586 A1 | 7/2021 | Lewis et al. |
| 2021/0207771 A1 * | 7/2021 | Lewis ..................... F17C 1/007 |
| 2021/0388809 A1 | 12/2021 | Young et al. |
| 2021/0388810 A1 | 12/2021 | Young et al. |
| 2022/0090585 A1 | 3/2022 | Lewis et al. |

(56) References Cited

U.S. PATENT DOCUMENTS

| | | | |
|---|---|---|---|
| 2022/0196341 A1* | 6/2022 | Young | B65G 5/00 |
| 2023/0110494 A1 | 4/2023 | Lewis et al. | |
| 2023/0332843 A1 | 10/2023 | Lewis et al. | |
| 2024/0035621 A1 | 2/2024 | Stradiotto et al. | |
| 2024/0191725 A1 | 6/2024 | Young et al. | |
| 2024/0218885 A1 | 7/2024 | Young et al. | |

FOREIGN PATENT DOCUMENTS

| | | | | |
|---|---|---|---|---|
| CA | 1160063 A | 1/1984 | | |
| CA | 1179511 A | 12/1984 | | |
| CA | 1281611 C | 3/1991 | | |
| CA | 2785004 A1 | 6/2011 | | |
| CA | 2807502 A1 | 2/2012 | | |
| CA | 2824798 A1 | 7/2012 | | |
| CA | 2982255 A1 | 10/2016 | | |
| CA | 3052080 A1 | 8/2018 | | |
| CA | 3055620 A1 | 9/2018 | | |
| CN | 103206349 A | 7/2013 | | |
| CN | 205422944 U | 8/2016 | | |
| CN | 107842392 A | 3/2018 | | |
| CN | 207847852 U | 9/2018 | | |
| DE | 2636417 A1 | 2/1978 | | |
| DE | 102010055750 A1 | 6/2012 | | |
| EP | 566868 A1 | 10/1993 | | |
| EP | 1443177 A1 | 8/2004 | | |
| EP | 2447501 A2 | 5/2012 | | |
| EP | 2450549 A2 | 5/2012 | | |
| EP | 2530283 A1 | 12/2012 | | |
| EP | 2549090 A1 | 1/2013 | | |
| EP | 2559881 A2 | 2/2013 | | |
| EP | 2832666 A1 | 2/2015 | | |
| FR | 2706432 A1 | 12/1994 | | |
| FR | 3019854 A1 | 10/2015 | | |
| FR | 3023321 A1 | 1/2016 | | |
| GB | 1213112 A | 11/1970 | | |
| GB | 2013318 A | 8/1979 | | |
| GB | 2528449 A | * | 1/2016 | F01K 3/12 |
| JP | S54133211 A | 10/1979 | | |
| JP | S55-115498 U | 8/1980 | | |
| JP | S5797997 A | 6/1982 | | |
| JP | H0275730 A | 3/1990 | | |
| JP | H04121424 A | 4/1992 | | |
| JP | H05214888 A | 8/1993 | | |
| JP | H07330079 A | 12/1995 | | |
| JP | H09-154244 A | 6/1997 | | |
| JP | 2636417 B2 | 7/1997 | | |
| JP | H09287156 A | 11/1997 | | |
| JP | H1121926 A | 1/1999 | | |
| JP | 2005009609 A | 1/2005 | | |
| JP | 2013509528 A | 3/2013 | | |
| JP | 2016211515 A | 12/2016 | | |
| WO | 1998039613 A1 | 9/1998 | | |
| WO | 2011053411 A1 | 5/2011 | | |
| WO | 2012097216 A1 | 7/2012 | | |
| WO | 2013/131202 A1 | 9/2013 | | |
| WO | 2014183894 A1 | 11/2014 | | |
| WO | 2015019096 A1 | 2/2015 | | |
| WO | WO-2015015184 A2 | * | 2/2015 | F02C 1/02 |
| WO | 2015159278 A1 | 10/2015 | | |
| WO | 2016012764 A1 | 1/2016 | | |
| WO | 2016131502 A1 | 8/2016 | | |
| WO | 2016185906 A1 | 11/2016 | | |
| WO | 2017093768 A1 | 6/2017 | | |
| WO | 2017140481 A1 | 8/2017 | | |
| WO | 2017194253 A1 | 11/2017 | | |
| WO | 2017198397 A1 | 11/2017 | | |
| WO | 2018/141057 A1 | 8/2018 | | |
| WO | 2018161172 A1 | 9/2018 | | |
| WO | 2019011593 A1 | 1/2019 | | |
| WO | 2019218084 A1 | 11/2019 | | |
| WO | 2019218085 A1 | 11/2019 | | |
| WO | 2020146938 A1 | 7/2020 | | |
| WO | 2020160635 A1 | 8/2020 | | |
| WO | 2020160670 A1 | 8/2020 | | |
| WO | 2020160681 A1 | 8/2020 | | |
| WO | 2020172748 A1 | 9/2020 | | |
| WO | 2022213179 A1 | 10/2022 | | |
| WO | 2022226656 A1 | 11/2022 | | |
| WO | 2024130447 A1 | 6/2024 | | |

OTHER PUBLICATIONS

RWE Power AG: Essen/Koln, "Adele—Adiabatic Compressed-Air Energy Storage for Electricity Supply", Feb. 3, 2011; http://www.rwe.com/web/cms/mediablob/en/391748/data/235554/1/rwe-power-ag/press/company/Brochure-ADELE.pdf.

Sequi, P.M. "Modelling of the Dynamic Behavior of an Advanced Adiabatic Compressed Air Energy Storage (AA-CAES)", Nov. 2018; 154 pages with Translation; http://oa.upm.es/53802/1/TFG_PABLO_MARTIN_SEQUI.pdf.

Wang, J. et al., Overview of Compressed Air Energy Storage and Technology Development; Energies; 2017; 10, 991; 22 pages; http:!/wrap.warwick.ac. uk/91858/7/WRAP-overview-compressed-air-energy-storage-technology-Jevelopment-Wang-2017.pdf.

RWE Power AG: Essen/Kain, "ADELE—Adiabatic Compressed-Air Energy Storage for Electricity Supply", Feb. 3, 2011; http://www.rwe.com/web/cms/mediablob/en/391748/data/235554/1/rwe-power-ag/press/company/Brochure-ADELE.pdf.

Laubscher, Hendrik et al. "Developing a cost effective rock bed thermal energy storage system: Design and modelling", article published Jun. 27, 2017.

Jorio, Luigi, "A huge battery made of air" online article published Aug. 10, 2016, available at https:// www.swissinfo.ch/eng/sci-tech/energy-in-the-mountains_a-huge-battery-made-of-air/42362400.

Shell and Tube Heat Exchangers article available online from Thermopedia as of Feb. 8, 2011, available at https://www.thermopedia.com/content/1121 /.

"Coil-Wound Heat Exchangers (CWHEs)" publication from Linde Engineering, copyright 2018-2019, available online at https://assets.linde.com/-/media/global/engineering/engineering/home/products-and-services/plant-components/plate-fin-heat-exchangers/coil-wound-heat-exchanger-2019.pdf.

Sequi, P.M., "Modelling of the Dynamic Behavior of an Advanced Adiabatic Compressed Air Energy Storage (AA-CAES", Escuela Tecnica Superior de Ingenieros Industriales—UPM, (20181100), pp. 41-117, URL: http://oa.upm.es/53802/1/TFG_PABLO_MARTIN_SEQUI.pdf, (Mar. 25, 2020), XP055731474.

* cited by examiner

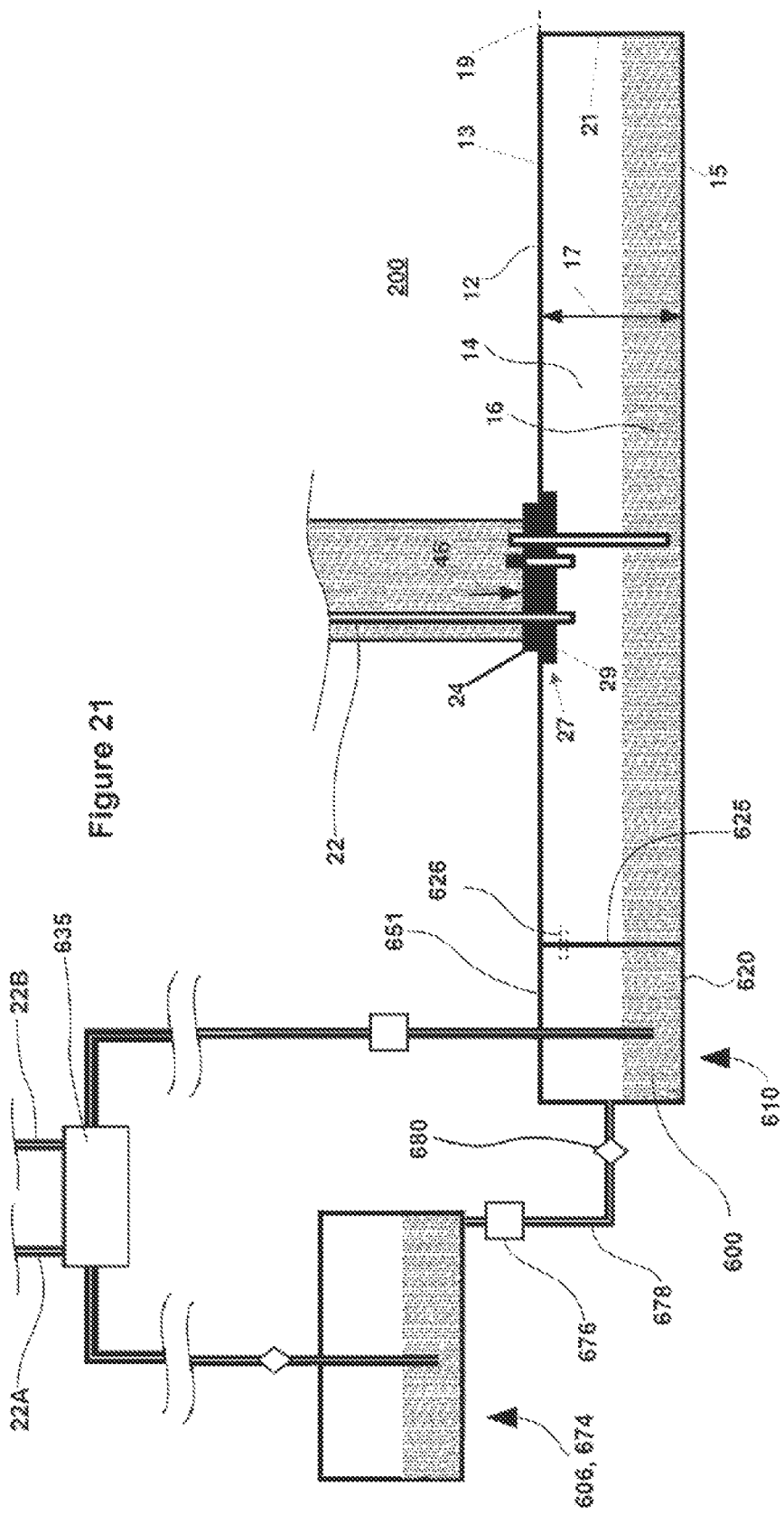

THERMAL STORAGE IN PRESSURIZED FLUID FOR COMPRESSED AIR ENERGY STORAGE SYSTEMS

CROSS-REFERENCE TO RELATED APPLICATIONS

This application is a continuation of U.S. patent application Ser. No. 18/168,078, filed Feb. 13, 2023, which is a continuation of U.S. patent application Ser. No. 17/526,508 filed Nov. 15, 2021, now U.S. Pat. No. 11,644,150, which is a continuation of U.S. patent application Ser. No. 16/492,401 filed Sep. 9, 2019, now U.S. Pat. No. 11,274,792, which is a 371 national stage of International Patent Application No. PCT/CA2018/050282, filed Mar. 9, 2018, which claims priority to U.S. Provisional Patent Application Ser. No. 62/469,264, filed Mar. 9, 2017 and priority to International Patent Application No. PCT/CA2018/050112, filed Jan. 31, 2018, the entirety of these applications being incorporated by reference herein.

FIELD OF THE DISCLOSURE

The present disclosure relates generally to compressed gas energy storage, and more particularly to a compressed gas energy storage system such as, for example, one including a hydrostatically compensated, substantially isobaric compressed air energy storage accumulator located underground, the use thereof, as well as a method of storing compressed gas. The present disclosure also relates generally to a system and method for providing a system for keeping a heated fluid, such as water, in a liquid state and at a pressure that allows fluid to accept greater heat to store and release than would be practical under atmospheric conditions.

BACKGROUND

Electricity storage is highly sought after, in view of the cost disparities incurred when consuming electrical energy from a power grid during peak usage periods, as compared to low usage periods. The addition of renewable energy sources, being inherently of a discontinuous or intermittent supply nature, increases the demand for affordable electrical energy storage worldwide.

Thus there exists a need for effectively storing the electrical energy produced at a power grid or a renewable source during a non-peak period and providing it to the grid upon demand. Furthermore, to the extent that the infrastructural preparation costs and the environmental impact from implementing such infrastructure are minimized, the utility and desirability of a given solution is enhanced.

Furthermore, as grids transform and operators look to storage in addition to renewables to provide power and remove traditional forms of generation that also provide grid stability, such as voltage support, a storage method that offers inertia based synchronous storage is highly desirable.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In accordance with one broad aspect of the teaching described herein, which may be used alone or in combination with any other aspects, a compressed gas energy storage system may include an accumulator having an interior configured to contain compressed gas when in use, wherein the accumulator has a primary opening, an upper wall, a lower wall and the accumulator interior containing a compressed gas being at least partially bounded by the upper wall and lower wall. The compressed gas energy storage system may further include a gas compressor/expander subsystem spaced apart from the accumulator and comprising at least a first compression stage having a gas inlet and a gas outlet in fluid communication with the accumulator interior via a gas conduit for conveying compressed gas to the accumulator when in a charging mode and from the accumulator when in a discharging mode. The compressed gas energy storage system may further include a thermal storage subsystem, comprising: (i) at least a first storage reservoir configured to contain a thermal storage liquid at a storage pressure that is greater than atmospheric pressure, wherein the first storage reservoir comprises a pressurized layer of cover gas above the thermal storage liquid and the layer of cover gas is formed by a boiling of a portion of the thermal storage liquid within the first storage reservoir whereby the layer of cover gas is pressurized to the storage pressure; (ii) a liquid passage having an inlet connectable to a thermal storage liquid source and configured to convey the thermal storage liquid to the first storage reservoir, and (iii) a first heat exchanger provided in the liquid passage and in fluid communication between the first compression stage and the accumulator, whereby when the compressed gas energy storage system is in the charging mode thermal energy is transferred from a compressed gas stream exiting the gas compressor/expander subsystem to the thermal storage liquid.

The thermal storage liquid may be heated to a storage temperature prior to entering the first storage reservoir, wherein the storage temperature is below a boiling temperature of the thermal storage liquid when at the storage pressure and is above the boiling temperature of the thermal storage liquid when at atmospheric pressure.

The storage temperature is between about 150 degrees Celsius and about 350 degrees Celsius.

The compressed gas within the accumulator may be at an accumulator pressure, and wherein the storage pressure is less than the accumulator pressure.

The first storage reservoir may at least partially disposed within the accumulator.

The thermal storage liquid source may include a source reservoir containing a quantity of the thermal storage liquid at a source temperature that is less than a storage temperature.

The source reservoir may be external the first storage reservoir.

The gas compressor/expander subsystem may further include a second compression stage downstream from the first compression stage and the first heat exchanger is fluid communication between the first compression stage and the second compression stage, and the thermal storage subsystem further comprises a second heat exchanger in fluid communication between the second compression stage and the accumulator, whereby thermal energy is transferred between the compressed gas stream exiting the second compression stage and the thermal storage liquid.

The gas compressor/expander subsystem may further include a third compression stage downstream from the second compression stage and the second heat exchanger is fluid communication between the second compression stage and the third compression stage, and the thermal storage subsystem further comprises a third heat exchanger in fluid communication between the third compression stage and the accumulator, whereby thermal energy is transferred between the compressed gas stream exiting the third compression stage and the thermal storage liquid.

The first storage reservoir may include a single chamber having a chamber bottom wall, a chamber top wall, a chamber sidewall extending therefrom and defining a chamber interior configure to contain the thermal storage liquid.

The single chamber may include a natural underground cavity formed at least partially of natural rock.

The compressed gas energy storage system may further include a storage liner covering at least a portion of an interior surface of the chamber.

The compressed gas energy storage system may further include an extraction pump in liquid communication with the thermal storage liquid in the first storage reservoir and selectably operable to pump the thermal storage liquid at the storage temperature out of the first storage reservoir, and wherein when an exit stream of gas is released from the accumulator, thermal energy is transferred from the thermal storage liquid pumped out of the first storage reservoir into the exit stream of gas.

The exit stream of gas and the thermal storage liquid pumped out of the first storage reservoir may pass through the first heat exchanger.

The first storage reservoir may be disposed entirely under ground.

The compressed gas energy storage system may further include a reservoir cooling system for selectably cooling a temperature of the thermal storage liquid contained in the first storage reservoir, thereby reducing the storage pressure within the first storage reservoir.

When the compressed gas energy storage system is in the discharging mode, compressed gas may travel from the accumulator to the gas compressor/expander subsystem and at least a portion of the thermal storage liquid at the storage temperature is withdrawn from the first storage reservoir and the thermal storage subsystem is operable so that thermal energy is transferred from at least the portion of the thermal storage liquid withdrawn from the first storage reservoir to the compressed gas exiting the accumulator whereby the temperature of the compressed gas exiting the accumulator is increased before it reaches the gas compressor/expander subsystem.

When the compressed gas energy storage system is in the discharging mode the compressed gas traveling from the accumulator to the gas compressor/expander subsystem passes through the first heat exchanger to receive thermal energy from the thermal storage liquid.

The first storage reservoir may be configured as an above-ground vessel.

In accordance with one broad aspect of the teachings described herein, which may be used alone or in combination with any other aspects, a compressed gas energy storage system may include an accumulator having an interior configured to contain compressed gas when in use. A gas compressor/expander subsystem may be spaced apart from the accumulator and may include at least a first compression stage having a gas inlet and a gas outlet in fluid communication with the accumulator interior for conveying compressed gas to the accumulator when in a charging mode and from the accumulator when in a discharging mode. A thermal storage subsystem may include at least a first storage reservoir disposed at least partially under ground and configured to contain a thermal storage liquid at a storage pressure that is greater than atmospheric pressure, a liquid passage having an inlet connectable to a thermal storage liquid source and configured to convey the thermal storage liquid to the liquid reservoir, and a first heat exchanger provided in the liquid inlet passage and in fluid communication between the first compression stage and the accumulator. Whereby when the compressed gas energy storage system is in the charging mode thermal energy is transferred from a compressed gas stream exiting the gas compressor/expander subsystem to the thermal storage liquid.

The thermal storage liquid may be heated to a storage temperature prior to entering the first storage reservoir. The storage temperature is below a boiling temperature of the thermal storage liquid when at the storage pressure and is the above boiling temperature of the thermal storage liquid when at atmospheric pressure.

The storage temperature may be between about 150 degrees Celsius and about 350 degrees Celsius.

A layer of compressed gas within the accumulator may be at an accumulator pressure, and the storage pressure may be equal to or greater than the accumulator pressure.

The storage pressure may be between about 100% and about 200% of the accumulator pressure.

The storage pressure may be between about 20 bar and about 60 bar.

The first storage reservoir may include a pressurized layer of cover gas above the thermal storage liquid.

The thermal storage liquid may be isolated from the layer of liquid within the accumulator to prevent mixing therebetween and further comprising a gas pressurization passage fluidly connecting the layer of compressed gas within the accumulator to the layer of cover gas, whereby pressurizing the accumulator pressurizes the first storage reservoir.

A flow regulator may be positioned in the gas pressurization passage and configured to permit gas to flow from accumulator to the first storage reservoir and to prevent gas from first storage reservoir to the accumulator, so that the storage pressure can be higher than the accumulator pressure.

A thermal storage compressor system may be configured to pressurize the layer of cover gas to the storage pressure.

The layer of cover gas may be formed by the boiling of a portion of the thermal storage liquid within the first storage reservoir whereby the layer of cover gas is pressurized to the storage pressure.

A thermal conditioning system may be in fluid communication with the layer of cover gas, the thermal conditioning system operable to reduce the temperature of the layer of cover gas.

The first storage reservoir may be at least partially disposed within the accumulator.

The thermal storage liquid source may include a source reservoir containing a quantity of the thermal storage liquid at a source temperature that is less than the storage temperature.

The thermal storage liquid within the source reservoir may be at a source pressure that is greater than atmospheric pressure.

The source pressure may be substantially equal to the storage pressure.

The source reservoir may be external the first storage reservoir.

The thermal storage liquid in the first storage reservoir may be isolated from the quantity of thermal storage liquid in the source reservoir to prevent mixing therebetween and the source reservoir may include a layer of cover gas above the quantity of thermal storage liquid, and further comprising a reservoir gas passage fluidly connecting the layer of cover gas within the first storage reservoir to the layer of cover gas within the source reservoir, whereby the first storage reservoir and source reservoir are maintained at the same pressure.

The source reservoir may include a body of water.

The source reservoir may be at least partially disposed within the accumulator.

The first storage reservoir may be at least partially underground.

The gas compressor/expander system may include a second compression stage downstream from the first compression stage and the first heat exchanger may be fluid communication between the first compression stage and the second compression stage. The thermal storage subsystem may include a second heat exchanger in fluid communication between the second compression stage and the accumulator. Thermal energy may be transferred between the compressed gas stream exiting the second compression stage and the thermal storage liquid.

The gas compressor/expander system may include a third compression stage downstream from the second compression stage and the second heat exchanger may be fluid communication between the second compression stage and the third compression stage. The thermal storage subsystem may include a third heat exchanger in fluid communication between the third compression stage and the accumulator. Thermal energy may be transferred between the compressed gas stream exiting the third compression stage and the thermal storage liquid.

The first storage liquid reservoir may include a single chamber having a chamber bottom wall, a chamber top wall, a chamber sidewall extending therefrom and may define a chamber interior configure to contain the thermal storage liquid.

The chamber may include a natural underground cavity formed at least partially of natural rock.

A storage liner may cover at least a portion of an interior surface of the chamber.

The compressed gas energy storage system of any one of claims 1 to Error! Reference source not found., wherein the first storage reservoir comprises an outer chamber having a chamber upper wall, a chamber bottom wall, a chamber sidewall extending therefrom and defining a chamber interior, and at least a first liquid tank having a tank bottom wall, a tank sidewall extending therefrom and defining a tank interior, the first liquid tank being disposed within the interior of the chamber and configured to contain the thermal storage liquid.

The tank interior may be in fluid communication with the interior of the chamber whereby an internal pressure of the tank is substantially equalized with an internal pressure of the chamber.

An upper end of the tank may be at least partially open to provide the fluid communication with the interior of the chamber.

The tank may be formed at least partially from at least one of concrete and metal.

The tank bottom wall may be spaced above the chamber bottom wall and a bottom thermal insulation layer may be positioned therebetween to inhibit heat transfer from the tank bottom wall to the chamber bottom wall.

The bottom thermal insulation layer may include at least one of a gas layer, an insulating material layer, and a flowing cooling fluid layer.

The tank sidewall may be spaced apart from the chamber sidewall, and a sidewall thermal insulation layer may be positioned therebetween to inhibit heat transfer from the tank sidewall to the chamber sidewall.

The sidewall thermal insulation layer may include at least one of a gas layer, an insulating material layer, and a flowing cooling fluid layer.

An extraction pump may be in liquid communication with the thermal storage liquid in the first storage reservoir and may be selectably operable to pump the thermal storage liquid at the storage temperature out of the first storage reservoir.

An exit stream of gas is released from the accumulator, thermal energy is transferred from the thermal storage liquid pumped out of the first storage reservoir into the exit stream of gas.

The exit stream of gas and the thermal storage liquid pumped out of the first storage reservoir may pass through the first heat exchanger.

The pump may include a progressive cavity pump having a rotor and complimentary stator disposed within the first storage reservoir. A motor may be disposed external the first storage reservoir and a shaft may drivingly connect the rotor to the motor.

The motor may be disposed above ground.

The first storage reservoir may be disposed entirely under ground.

A reservoir cooling system may be configured to selectably cool the temperature of the thermal storage liquid contained in the first storage reservoir, thereby reducing the storage pressure within the first storage reservoir.

The reservoir cooling system may include a quantity of a cooling liquid stored at a cooling temperature that is below the storage temperature and may be operable to introduce the quantity of cooling liquid into the first storage reservoir, thereby diluting and reducing the temperature of the thermal storage liquid contained in the first storage reservoir.

The reservoir cooling system may include an actuatable drain apparatus that is openable to drain at least some of the thermal storage liquid from the first storage reservoir into a cooling chamber containing a quantity of a cooling liquid stored at a cooling temperature that is below the storage temperature.

The cooling chamber may be disposed at a lower elevation than the first storage reservoir, whereby when the drain apparatus is opened the thermal storage liquid flows into the cooling chamber under the influence of gravity.

The drain apparatus may include a pressure-actuated drain valve that is operable to open automatically when the storage pressure exceeds a predetermined automatic-cooling pressure threshold.

The accumulator may have a primary opening, an upper wall, a lower wall and an accumulator interior containing a layer of the compressed gas above a layer of water when in use and may be at least partially bounded the upper wall and lower wall.

A shaft may have a lower end adjacent the primary opening, an upper end spaced apart from the lower end, and a shaft sidewall extending upwardly from the lower end to the upper end and at least partially bounding a shaft interior for containing a quantity of a liquid, the shaft being fluidly connectable to a liquid source/sink via a liquid supply conduit.

A partition may cover the primary opening and may separate the accumulator interior from the shaft interior. The partition may have an outer surface in communication with the shaft interior and an opposing inner surface in communication with the accumulator interior.

At least one of the layer of compressed gas and the layer of liquid may bear against and exert an internal accumulator force on the inner surface of the partition and the quantity of liquid within the shaft may bear against and exert an external counter force on the outer surface of the partition, whereby a net force acting on the partition while the compressed gas energy storage system is in use is a difference between the accumulator force and the counter force and is less than the accumulator force.

When the compressed gas energy storage system is in the discharging mode compressed gas may travel from the accumulator to the gas compressor/expander subsystem and at least a portion of the thermal storage liquid at the storage temperature may be withdrawn from the first storage reservoir and the thermal storage subsystem may be operable so that thermal energy is transferred from at least the portion of the thermal storage liquid withdrawn from the first storage reservoir to the compressed gas exiting the accumulator whereby the temperature of the compressed gas exiting the accumulator is increased before it reaches the gas compressor/expander subsystem.

When the compressed gas energy storage system is in a discharging mode the compressed gas traveling from the accumulator to the gas compressor/expander subsystem may pass through the first heat exchanger to receive thermal energy from the thermal storage liquid.

Other aspects and embodiments are described in further detail below.

BRIEF DESCRIPTION OF THE DRAWINGS

Embodiments of the invention will now be described with reference to the appended drawings in which:

FIG. 21 is a schematic, cross-sectional view of components of yet another example of a compressed gas energy storage system;

DETAILED DESCRIPTION

Figure 1:
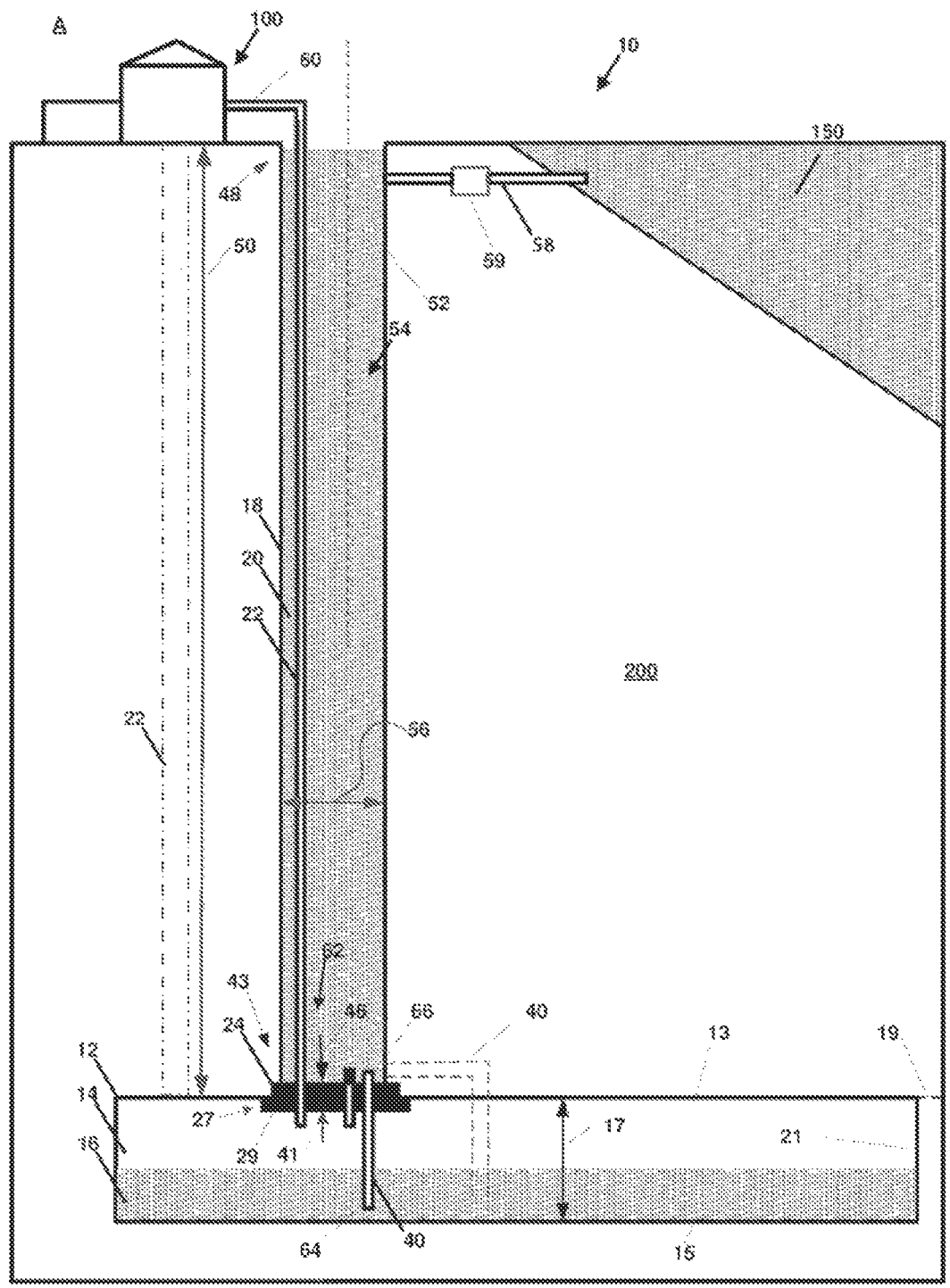
FIG. 1 is a schematic, cross-sectional view of components of one example of a hydrostatically compensated compressed gas energy storage system.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Energy produced by some types of energy sources, such as windmills, solar panels and the like may tend to be produced during certain periods (for example when it is windy, or sunny respectively), and not produced during other periods (if it is not windy, or at night, etc.). However, the demand for energy may not always match the production periods, and it may be useful to store the energy for use at a later time. Similarly, it may be helpful to store energy generated using conventional power generators (coal, gas and/or nuclear power plants for example) to help facilitate storage of energy generated during non-peak periods (e.g. periods when electricity supply could be greater than demand and/or when the cost of electricity is relatively high) and allow that energy to be utilized during peak periods (e.g. when the demand for electricity may be equal to or greater than the supply, and/or when the cost of electricity is relatively high).

As described herein, compressing and storing a gas (such as air), using a suitable compressed gas energy storage system, is one way of storing energy for later use. For example, during non-peak times, energy (i.e. electricity) can be used to drive compressors and compress a volume of gas to a desired, relatively high pressure for storage. The gas can then be stored at the relatively high pressure inside any suitable container or vessel, such as a suitable accumulator. To extract the stored energy, the pressurized gas can be released from the accumulator and used to drive any suitable expander apparatus or the like, and ultimately to be used to drive a generator or the like to produce electricity. The amount of energy that can be stored in a given compressed gas energy storage system may be related to the pressure at which the gas is compressed/stored, with higher pressure storage generally facilitating a higher energy storage. However, containing gases at relatively high pressures in conventional systems, such as between about 45-150 atm, can require relatively strong, specialized and often relatively costly storage containers/pressure vessels.

Referring to FIG. 1 one example of a hydrostatically compensated compressed gas energy storage system 10, that can be used to compress, store and release a gas, includes an accumulator 12 that is located underground (although in another embodiment the accumulator may be located above ground). In this example, the accumulator 12 serves as a chamber for holding both compressed gas and a liquid (such as water) and can include any suitable type of pressure vessel or tank, or as in this example can be an underground cave or chamber that is within ground 200. In this embodiment, accumulator 12 is lined, for example using concrete, metal, plastic and combinations thereof or the like, to help make it substantially gas and/or liquid impermeable so as to help to prevent unwanted egress of gas or liquid from within the interior 23. In another embodiment, the accumulator is preferably impermeable to gas and or liquid without requiring a lining.

The accumulator 12 may have any suitable configuration, and in this example, includes an upper wall 13 and an opposing lower wall 15 that are separated from each other by an accumulator height 17. The upper and lower walls 13 and 15 may be of any suitable configuration, including curved, arcuate, angled, and the like, and in the illustrated example are shown as generally planar surfaces, that are generally parallel to a horizontal reference plane 19. The accumulator 12 also has an accumulator width (not shown—measured into the page as illustrated in FIG. 1). The upper and lower walls 13 and 15, along with one or more sidewalls 21 at least partially define an interior 23 of the accumulator 12, that has an accumulator volume. The accumulator 12 in a given embodiment of the system 10 can be sized based on a variety of factors (e.g. the quantity of gas to be stored, the available space in a given location, etc.) and may, in some examples may be between about 1,000 m$^3$ and about 2,000,000 m$^3$ or more. For example, in this embodiment the accumulator 12 contains a layer of stored compressed gas 14 atop a layer of liquid 16, and its volume (and thus capacity) can be selected based on the quantity of gas 14 to be stored, the duration of storage required for system 10, and other suitable factors which may be related to the capacity or other features of a suitable power source and/or power load (see power source/load S/L in FIG. 5) with which the system 10 is to be associated. The power source/load S/L may be, in some examples, a power grid, a power source (including renewable and optionally non-renewable sources) and the like.

Preferably, the accumulator 12 may be positioned below ground or underwater, but alternatively may be at least partially above ground. Positioning the accumulator 12 within the ground 200, as shown, may allow the weight of the ground/soil to help backstop/buttress the walls 13, 15 and 21 of the accumulator 12, and help resist any outwardly acting forces that are exerted on the walls 13, 15 and 21 of the interior 23 of the accumulator. Its depth in the ground is established according to the pressures at which the compression/expansion equipment to be used is most efficiently operated.

The gas that is to be compressed and stored in the accumulator 12 may be any suitable gas, including, but not limited to, air, nitrogen, noble gases and combinations thereof and the like. Using air may be preferable in some embodiments as a desired quantity of air may be drawn into the system from the surrounding, ambient environment and gas/air that is released from within the accumulator 12 can similarly be vented to the ambient environment, optionally without requiring further treatment. In this embodiment, the compressed gas 14 is compressed atmospheric air, and the liquid is water.

Optionally, to help provide access to the interior of the accumulator 12, for example for use during construction of the accumulator and/or to permit access for inspection and/or maintenance, the accumulator 12 may include at least one opening that can be sealed in a generally air/gas tight manner when the system 10 is in use. In this example, the accumulator 12 includes a primary opening 27 that is provided in the upper wall 13. The primary opening 27 may be any suitable size, and may have a cross-sectional area (taken in the plane 19) that is adequate based on the specific requirements. In one embodiment the cross-sectional area is between about 0.75 m$^2$ and about 80 m$^2$, but may be larger or smaller in a given embodiment.

Figure 2:
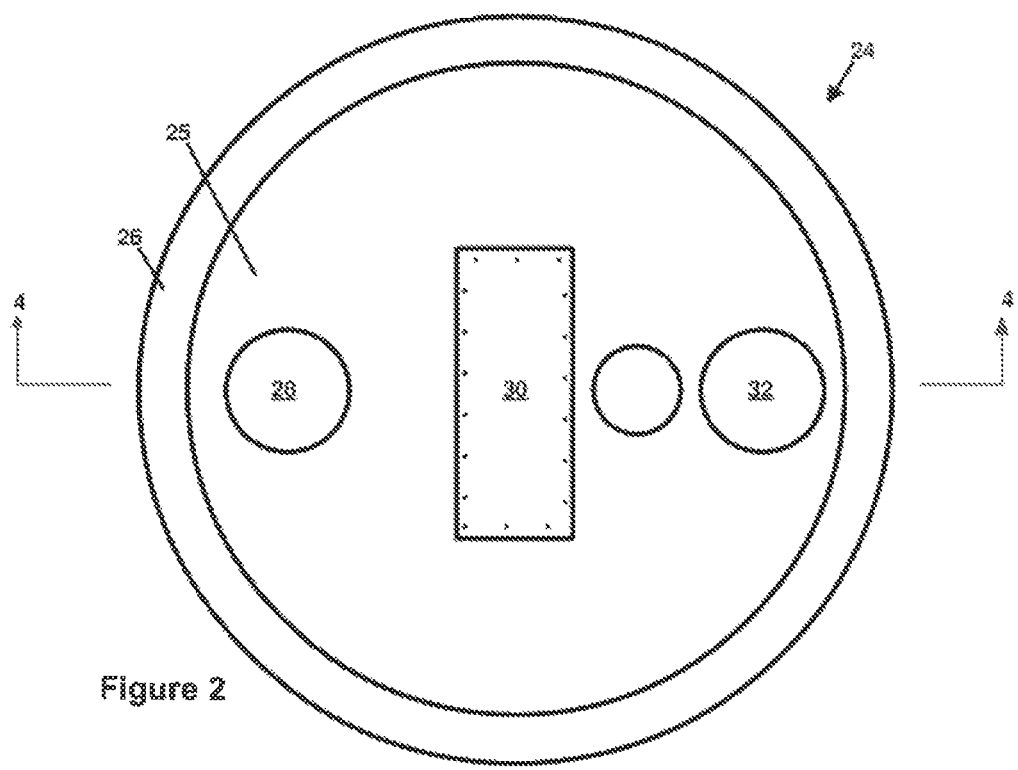
FIG. 2 is a top plan view of components of a bulkhead for the compressed gas energy storage subsystem of FIG. 1.
Figure 3:
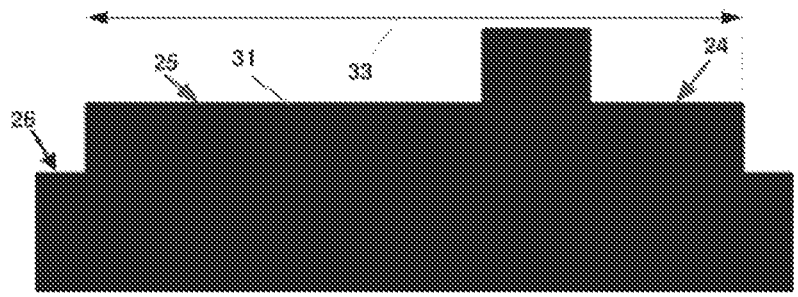
FIG. 3 is a side elevation view of the bulkhead of FIG. 2.
Figure 4:
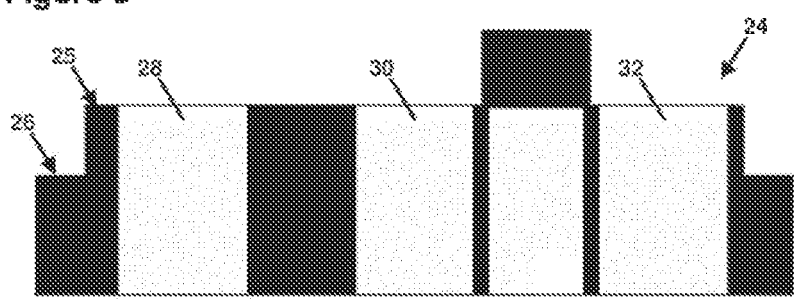
FIG. 4 is a side cross-sectional view of the bulkhead of FIG. 2, taken along line 4-4.

When the system 10 is in use, the primary opening 27 may be sealed using any suitable type of partition that can function as a suitable sealing member. In the embodiment of FIG. 1, the system 10 includes a partition in the form of a bulkhead 24 that covers the primary opening 27. FIG. 2 is a top plan view of components of this embodiment of a bulkhead 24, and FIGS. 3 and 4 are side elevation and side cross-sectional views, respectively, of bulkhead 24. In this example, the bulkhead 24 has a main body 25 that includes a lower surface 29 that faces the interior 23 of the accumulator 12, and in one alternative, is generally exposed to and in fluid communication with the compressed gas layer 14, and an opposing upper surface 31 at an upper end of the body 25 that faces interior 54. A flange 26 extends generally laterally outwardly toward the lower end of the bulkhead, such that the upper end of the bulkhead 24 has an upper width 33 that may be between about 1-8 m, and may be sized to fit within the opening 27, and the lower end of the bulkhead 24 has a lower width 35 that is greater than the upper width 33 and can be between about 1.2 m and about 10 m, for example. In this arrangement, a generally upwardly facing shoulder surface 37 is defined and extends around the periphery of the bulkhead 24. When the bulkhead 24 is in place, as shown in FIG. 1, the shoulder surface 37 can abut the upper surface 13 of the accumulator 12, and can help resist upward movement of the bulkhead 24 through the opening 27. The bulkhead 24 may be secured to, and preferably sealed with the upper wall 13 using any suitable mechanism to help seal and enclose the interior 23. In other embodiments, the bulkhead 24 may have a different, suitable configuration.

The bulkhead 24 may be manufactured in situ, or may be manufactured offsite, and may be made of any suitable material, including, concrete, metal, plastics, composites and the like. In the illustrated embodiment, the bulkhead 24 is assembled in situ at the interface between shaft 18 and accumulator 12 of multiple pieces of reinforced concrete.

In the embodiment of FIG. 1, the primary opening 27 is provided in the upper surface 13 of the accumulator 12. Alternatively, in other embodiments the primary opening 27 and any associated partition may be provided in different portions of the accumulator 12, including, for example, on a sidewall (such as sidewall 21), in a lower surface (such as lower surface 15) or other suitable location. The location of the primary opening 27, and the associated partition, can be selected based on a variety of factors including, for example, the soil and underground conditions, the availability of existing structures (e.g. if the system 10 is being retrofit into some existing spaces, such as mines, quarries, storage facilities and the like), operating pressures, shaft configurations and the like. For example, some aspects of the systems 10 described herein may be retrofit into pre-existing underground chambers, which may have been constructed with openings in their sidewalls, floors and the like. Utilizing some of these existing formations may help facilitate construction and/or retrofit of the chambers used in the system, and may reduce or eliminate the need to form additional openings in the upper surfaces of the chambers. Reducing the total number of openings in the accumulator may help facilitate sealing and may help reduce the chances of leaks and the like.

When the primary opening 27 extends along the sidewall 21 of the accumulator 12, it may be positioned such that is contacted by only the gas layer 14 (i.e. toward the top of the accumulator 12), contacted by only the liquid layer 16 (i.e. submerged within the liquid layer 16 and toward the bottom of the accumulator) and/or by a combination of both the gas layer 14 and the liquid layer 16 (i.e. partially submerged and partially non-submerged in the liquid). The specific position of the free surface of the liquid layer 16 (i.e. the interface between the liquid layer 16 and the gas layer 14) may change while the system 10 is in use as gas is forced into (causing the liquid layer to drop) and/or withdrawn from the accumulator (allowing the liquid level to rise).

Figure 16:
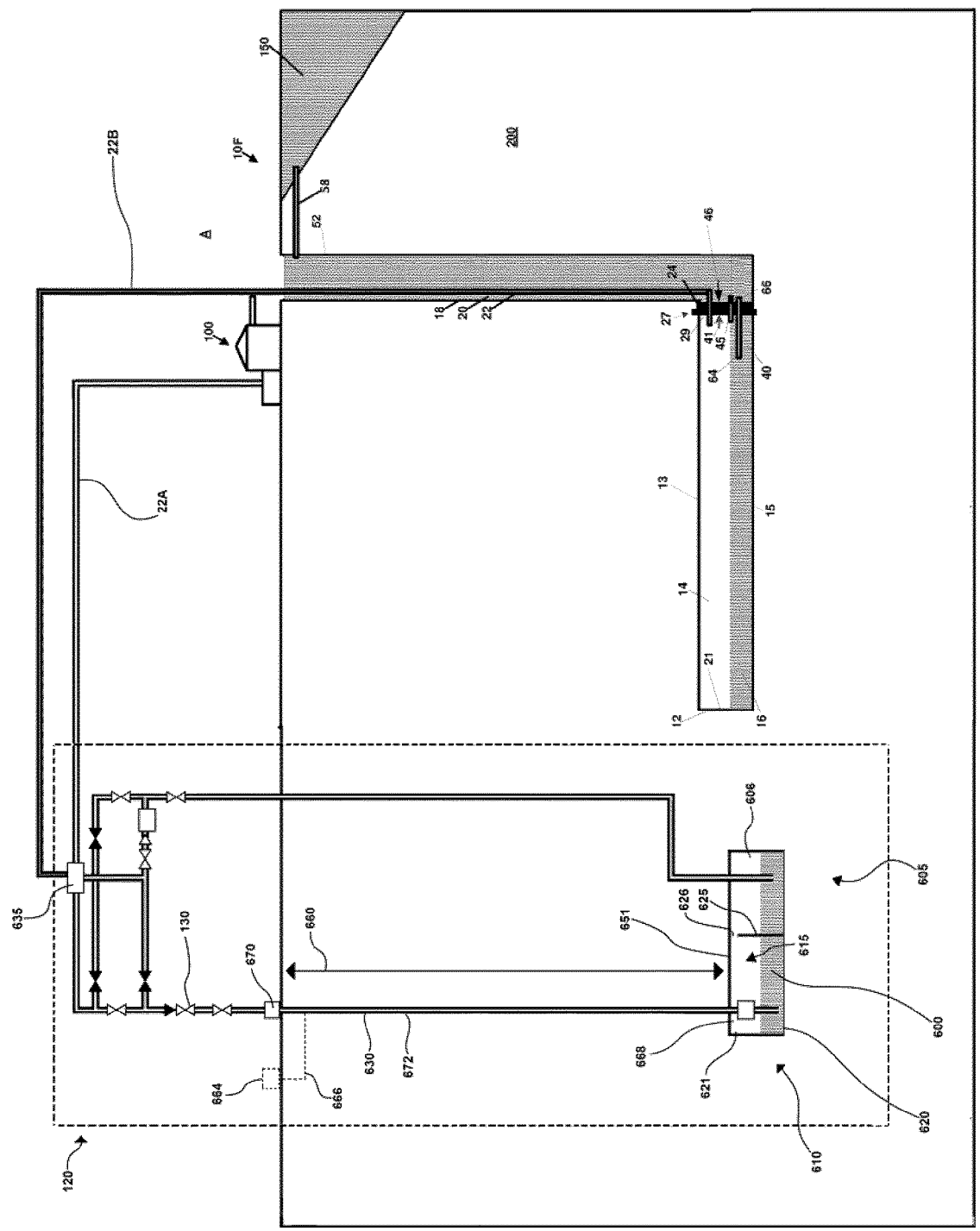
FIG. 16 is a schematic, cross-sectional view of components of another example of a compressed gas energy storage system.

As illustrated in the schematic representation in FIG. 16, the primary opening 27 is provided in the sidewall 15 of the accumulator 12, and the bulkhead 24 is positioned such that is generally partially submerged in the liquid layer 16 and partially exposed to the gas layer 14 when the system 10F is in use. In this example, the gas supply conduit 22 passes through the bulkhead 24 and is arranged so that its lower end 62 is located toward the top of the accumulator 12 so that it will remain in communication with the gas layer 14, and fluidly isolated from the liquid layer 16, regardless of the level of the liquid within the accumulator 12. Alternatively, the gas supply conduit 22 may be positioned such that it does not pass through the bulkhead 24 when the system is configured in this manner. A thermal storage subsystem 120, including any of the embodiments described herein, can be used in combination with an accumulator 12 having this arrangement. One example of a suitable thermal storage subsystem 120 is illustrated in FIG. 16.

In the embodiments of FIGS. 1 and 16, the partition includes a fabricated bulkhead 24 that is positioned to cover, and optionally seal the primary opening 27 in the accumulator perimeter. Alternatively, in other embodiments, the partition may be at least partially formed from natural materials, such as rock and the like. For example, a suitable partition may be formed by leaving and/or shaping portions of naturally occurring rock to help form at least a portion of the pressure boundary between the interior of the accumulator and the shaft. Such formations may be treated, coated or otherwise modified to help ensure they are sufficiently gas impermeable to be able to withstand the desired operating pressure differentials between the accumulator interior and the shaft. This may be done, in some embodiments, by selectively excavating the shaft 18 and accumulator 12 such that a portion of the surrounding rock is generally undisturbed during the excavation and construction of the shaft 18 and accumulator 12. Alternatively, rock or other such material may be re-introduced into a suitable location within the accumulator 12 and/or shaft 18 after having been previously excavated. This may help reduce the need to manufacture a separate bulkhead and install it within the system 10. In arrangements of this nature, the primary opening 27 may be formed as an opening in a sidewall 21 of the accumulator 12, or alternatively one side of the accumulator 12 may be substantially open such that the primary opening 27 extends substantially the entire accumulator height 17, and forms substantially one entire side of the accumulator 12.

Figure 17:
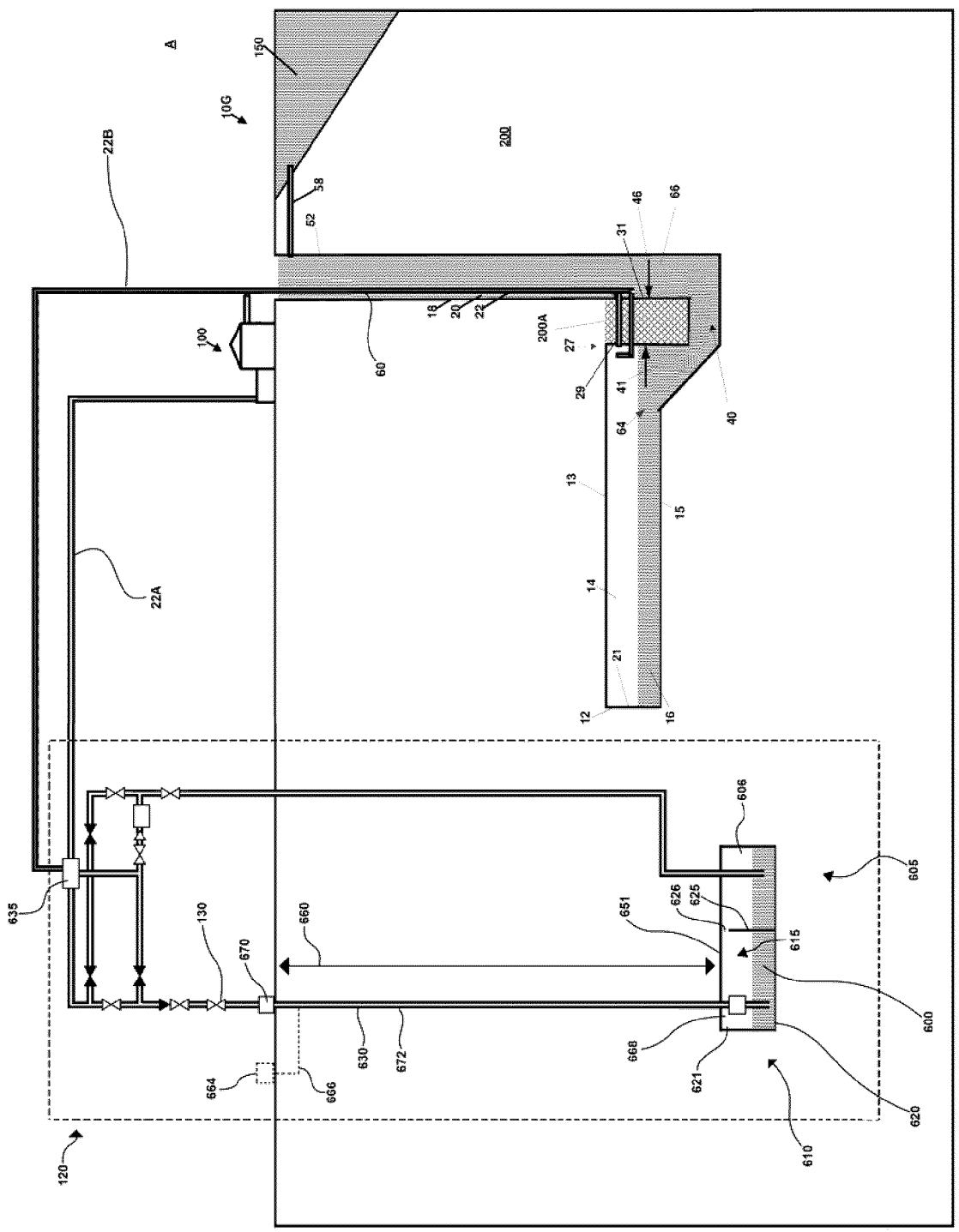
FIG. 17 is a schematic, cross-sectional view of components of yet another example of a compressed gas energy storage system.

Referring to FIG. 17, another embodiment of a compressed gas storage system 10G is configured with a partition that includes a projection 200A, identified using cross-hatching in FIG. 17, that is formed from generally the same material as the surrounding ground 200. In this example, the system 10G need not include a separately fabricated bulkhead 24 as shown in other embodiments. The system 10 in this embodiment is configured so that the gas supply conduit 22 is spaced apart from the projection 200A and does not extend through the partition. Instead, a separate shaft or bore can be provided to accommodate the conduit 22. To help provide liquid communication between the interior of the shaft 18 and the liquid layer 16, a liquid supply conduit 40 can be provided to extend through the projection 200A or, as illustrated, at least some of the liquid supply conduit 40 can be provided by a flow channel that passes beneath the projection 200A and fluidly connects the shaft 18 to the liquid layer 16, and in ends 64 and 66 of the liquid supply conduit 40 can be the open ends of the passage.

Optionally, in such embodiments the gas supply conduit 22 may be arranged to pass through the partition/projection 200A as illustrated in FIG. 17. In this arrangement (and in the embodiment shown in FIG. 16), the conduit 22 can be configured so that its end 62 is positioned toward the upper side of the accumulator 12 to help prevent the liquid layer 16 reaching the end 62. Alternatively, the gas supply conduit 22 need not pass through the partition, as schematically illustrated using dashed lines for alternative conduit 22. A thermal storage subsystem 120, including any of the embodiments described herein, can be used in combination with an accumulator 12 having this arrangement. One example of a suitable thermal storage subsystem 120 is illustrated in FIG. 17.

Optionally, the system 10G may be arranged so that the gas supply conduit 22 passes at least partially through the liquid supply conduit 40. This may help reduce the number of openings that need to be provided in the partition/projection 200A. In the embodiment of FIG. 17, another optional arrangement of gas supply conduit 22 is shown using dashed lines and passes through the flow channel, from the shaft 18 into the interior of the accumulator 12. In this arrangement, the gas supply conduit 22 is nested in, and passes through the liquid supply conduit 40, and passes beneath the projection 200A. Optionally, a configuration in which at least some of the gas supply conduit 22 is received within a portion of the liquid supply conduit 40 may also be utilized in other embodiments of the system 10 (including those described and illustrated herein), including those in which both the liquid supply conduit 40 and gas supply conduit 40 pass through the partition.

When the accumulator 12 is in use, at least one of the pressurized gas layer 14 and the liquid layer 16, or both, may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24. The magnitude of the internal accumulator force 41 is dependent on the pressure of the gas 14 and the cross-sectional area (taken in plane 19) of the lower surface 29. For a given lower surface 29 area, the magnitude of the internal accumulator force 41 may vary generally proportionally with the pressure of the gas 14.

Preferably, an inwardly, (downwardly in this embodiment) acting force can be applied to the outer-surface 31 of the bulkhead 24 to help offset and/or counterbalance the internal accumulator force 41. Applying a counter force of this nature may help reduce the net force acting on the bulkhead 24 while the system 10 is in use. This may help facilitate the use of a bulkhead 24 with lower pressure tolerances than would be required if the bulkhead 24 had to resist the entire magnitude of the internal accumulator force 41. This may allow the bulkhead 24 be relatively smaller, lighter and less costly. This arrangement may also help reduce the chances of the bulkhead 24 failing while the system 10 is in use. Optionally, a suitable counter force may be created by subjecting the upper surface 31 to a pressurized environment, such as a pressurized gas or liquid that is in contact with the upper surface 31, and calibrating the pressure acting on the upper surface 31 (based on the relative cross-sectional area of the upper surface 31 and the pressure acting on the lower surface 29) so that the resulting counter force, shown by arrow 46 in FIG. 1, has a desirable magnitude. In some configurations, the magnitude of the counter force 46 may be between about 80% and about 99% of the internal accumulator force 41, and may optionally be between about 90% and about 97%, and may be about equal to the magnitude of the internal accumulator force 41.

In the present embodiment, the system 10 includes a shaft 18 having a lower end 43 that is in communication with the opening 27 in the upper wall 13 of the accumulator 12, and an upper end 48 that is spaced apart from the lower end 43 by a shaft height 50. At least one sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear or helical decline, in other embodiments. The upper end 48 of the shaft 18 may be open to the atmosphere A, as shown, or may be capped, enclosed or otherwise sealed. In this embodiment, shaft 18 is generally cylindrical with a diameter 56 of about 3 metres, and in other embodiments the diameter 56 may be between about 2 m and about 15 m or more, or may be between about 5 m and 12 m, or between about 2 m and about 5 m. In such arrangements, the interior 52 of the shaft 18 may be able to accommodate about 1,000-150,000 m³ of water.

In this arrangement, the bulkhead 24 is positioned at the interface between the shaft 18 and the accumulator 12, and the outer surface 31 (or at least a portion thereof) closes and seals the lower end 43 of the shaft 18. Preferably, the other boundaries of the shaft 18 (e.g. the sidewall 52) are generally liquid impermeable, such that the interior 54 can be filled with, and can generally retain a quantity of a liquid, such as water 20. A water supply/replenishment conduit 58 can provide fluid communication between the interior 54 of the shaft 18 and a water source/sink 150 to allow water to flow into or out of the interior of the shaft 18 as required when the system 10 is in use. Optionally, a flow control valve 59 (as shown in FIG. 1) may be provided in the water supply/replenishment conduit 58. The flow control valve 59 can be open while the system 10 is in use to help facilitate the desired flow of water between the shaft 18 and the water source/sink 150. Optionally, the flow control valve 59 can be closed to fluidly isolate the shaft 18 and the water source/sink 150 if desired. For example, the flow control valve 59 may be closed to help facilitate draining the interior 54 of the shaft 18 for inspection, maintenance or the like.

The water source/sink 150 may be of any suitable nature, and may include, for example a connection to a municipal water supply or reservoir, a purposely built reservoir, a storage tank, a water tower, and/or a natural body of water such as a lake, river or ocean, groundwater, or an aquifer. In the illustrated example, the water source/sink 150 is illustrated as a lake. Allowing water to flow through the conduit 58 may help ensure that a sufficient quantity of water 20 may be maintained with shaft 18 and that excess water 20 can be drained from shaft 18. The conduit 58 may be connected to the shaft 18 at any suitable location, and preferably is connected toward the upper end 48. Preferably, the conduit 58 can be positioned and configured such that water will flow from the source/sink 150 to the shaft 18 via gravity, and need not include external, powered pumps or other conveying apparatus. Although the conduit 58 is depicted in the figures as horizontal, it may be non-horizontal.

In this example, the water 20 in the shaft 18 bears against the outside of bulkhead 24 and is thereby supported atop bulkhead 24. The amount of pressure acting on the outer surface 31 of the bulkhead 24 in this example will vary with the volume of water 20 that is supported, which for a given diameter 56 will vary with the height 50 of the water column. In this arrangement, the magnitude of the counter force 46 can then be generally proportional to the amount of water 20 held in the shaft 18. To increase the magnitude of the counter force 46, more water 20 can be added. To reduce the magnitude of the counter force 46, water 20 can be removed from the interior 54.

The layer of stored compressed air 14 underlying bulkhead 24 serves, along with the technique by which bulkhead 24 is stably affixed to the surrounding in the ground, in one alternative to surrounding stone in the ground at the interface between accumulator 12 and shaft 18, to support bulkhead 24 and the quantity of liquid contained within shaft 18.

Preferably, as will be described, the pressure at which the quantity of water 20 bears against bulkhead 24 and can be maintained so that magnitude of the counter force 46 is as equal, or nearly equal, to the magnitude of the internal accumulator force 41 exerted by the compressed gas in compressed gas layer 14 stored in accumulator 12. In the illustrated embodiment, operating system 10 so as to maintain a pressure differential (i.e. the difference between gas pressure inside the accumulator 12 and the hydrostatic pressure at the lower end 43 of the shaft 18) within a threshold amount—an amount preferably between 0 and 4 Bar, such as 2 Bar—the resulting net force acting on the bulkhead 24 (i.e. the difference between the internal accumulator force 41 and the counter force 46) can be maintained below a pre-determined threshold net force limit. Maintaining the net pressure differential, and the related net force magnitude, below a threshold net pressure differential limit may help reduce the need for the bulkhead 24 to be very large and highly-reinforced, and accordingly relatively expensive. In alternative embodiments, using a relatively stronger bulkhead 24 and/or installation technique for affixing the bulkhead 24 to the accumulator 12 may help withstand relatively higher pressure and net pressure differential, but may be more expensive to construct and install, all other things being equal. Furthermore, the height 17 of the accumulator 12 may be important to the pressure differential: if the height 17 is about 10 metres, then the upward pressure on the bulkhead 24 will be 1 Bar higher than the downward pressure on the bulkhead 24 from the water 20 in shaft 18.

Each of shaft 18 and accumulator 12 may be formed in a ground 200 using techniques similar to those used for producing mineshafts and other underground structures.

To help maintain substantially equal outward and inward forces 41 and 46 respectively on the bulkhead 24, the system 10 may be utilized to help maintain a desired differential in accumulator and shaft pressures that is below a threshold amount. These pressures may be controlled by adding or removing gas from the compressed gas layer 14 accumulator 12 using any suitable compressor/expander subsystem 100, and water can be conveyed between the liquid layer 16 and the water 20 in shaft 18.

In this embodiment, a gas conduit 22 is provided to convey compressed air between the compressed gas layer 14 and the compressor/expander subsystem 100, which can convert compressed air energy to and from electricity. Similarly, a liquid conduit 40 is configured to convey water between the liquid layer 16 and the water 20 in shaft 18. Each conduit 22 and 40 may be formed from any suitable material, including metal, plastic and the like.

In this example, the gas conduit 22 has an upper end 60 that is connected to the compressor/expander subsystem 100, and a lower end 62 that is in communication with the gas layer 14. The gas conduit 22 is, in this example, positioned inside and extends within the shaft 18, and passes through the bulkhead 24 to reach the gas layer 14. Positioning the gas conduit 22 within the shaft 18 may eliminate the need to bore a second shaft and/or access point from the surface to the accumulator 12. This position may also leave the gas conduit 22 generally exposed for inspection and maintenance, for example by using a diver or robot that can travel through the water 20 within the shaft 18 and/or by draining some or all of the water from the shaft 18. Alternatively, as shown using dashed lines in FIG. 1 and in the embodiment of FIG. 17, the gas conduit 22 may be external the shaft 18. Positioning the gas conduit 22 outside the shaft 18 may help facilitate remote placement of the compressor/expander subsystem 100 (i.e. it need not be proximate the shaft 18) and may not require the exterior of the gas conduit 22 (or its housing) to be submerged in water. This may also eliminate the need for the gas conduit 22 to pass through the partition that separates the accumulator 12 from the shaft 18.

The liquid conduit 40 is, in this example, configured with a lower end 64 that is submerged in the water layer 16 while the system 10 is in use and a remote upper end 66 that is in communication with the interior 54 of the shaft 18. In this configuration, the liquid conduit 40 can facilitate the exchange of liquid between the liquid layer 16 and the water 20 in the shaft 18. As illustrated in FIG. 1, the liquid conduit 40 can pass through the bulkhead 24 (as described herein), or alternatively, as shown using dashed lines, may be configured to provide communication between the liquid layer 16 and the water 20, but not pas through the bulkhead 24.

In this arrangement, as more gas is transferred into the gas layer 14 during an accumulation cycle, and its pressure increases, in this alternative slightly, water in the water layer 16 can be displaced and forced upwards through liquid conduit 40 into shaft 18 against the pressure of the water 20 in the shaft 18. More particularly, water can preferably freely flow from the bottom of accumulator 12 and into shaft 18, and ultimately may be exchanged with the source/sink 150 of water, via a replenishment conduit 58. Alternatively, any suitable type of flow limiting or regulating device (such as a pump, valve, orifice plate and the like) can be provided in the water conduit 40. When gas is removed from the gas layer 14, water can be forced from the shaft 18, through the water conduit 40, to refill the water layer 16. The flow through the replenishment conduit 58 can help ensure that a desired quantity of water 20 may be maintained within shaft 18 as water is forced into and out of the water layer 16, as excess water 20 can be drained from and make-up water can be supplied to the shaft 18. This arrangement can allow the pressures in the accumulator 12 and shaft 18 to at least partially, automatically re-balance as gas is forced into the accumulator 12.

Preferably, the lower end 64 of the liquid conduit 40 is positioned so that it is and generally remains submerged in the liquid layer 16 while the system 10 is in use, and is not in direct communication with the gas layer 14. In the illustrated example, the lower wall 15 is planar and is generally horizontal (parallel to plane 19, or optionally arranged to have a maximum grade of between about 0.01% to about 1%, and optionally between about 0.5% and about 1%, from horizontal), and the lower end 64 of the liquid conduit 40 is placed close to the lower wall 15. If the lower wall 15 is not flat or not generally horizontal, the lower end 64 of the liquid conduit 40 is preferably located in a relative low point of the accumulator 12 to help reduce the chances of the lower end 64 being exposed to the gas layer 14.

Similarly, to help facilitate extraction of gas from the gas layer, the lower end 62 of the gas conduit 22 is preferably located close to the upper wall 13, or at a relative high-point in the interior 23 of the accumulator 12. This may help reduce material trapping of any gas in the accumulator 12. For example, if the upper wall 13 were oriented on a grade, the point at which gas conduit 22 interfaces with the gas layer (i.e. its lower end 62) should be at a high point in the accumulator 12, to help avoid significant trapping of gas.

Figure 5:
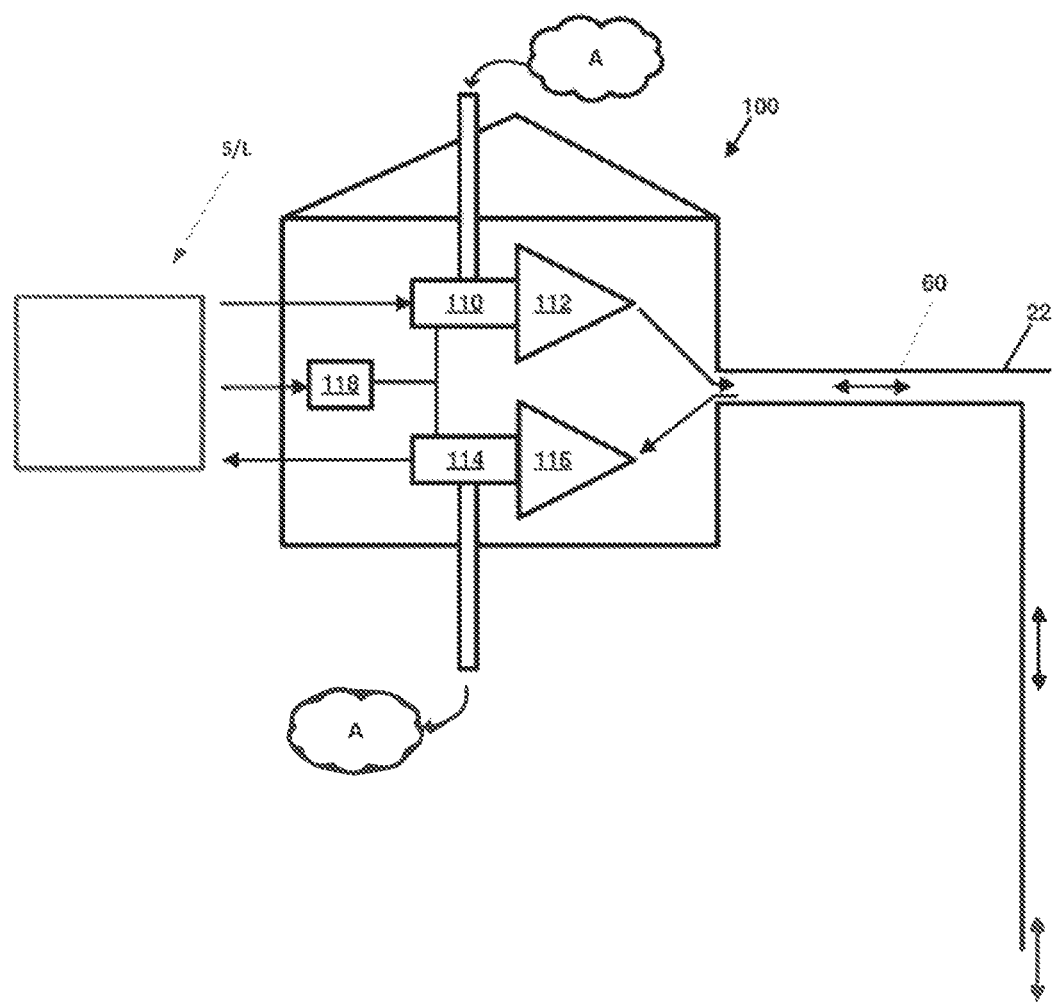
FIG. 5 is a schematic representation of components of one example of a compressor/expander subsystem that is usable with any of the compressed gas energy storage systems, according to an embodiment.

FIG. 5 is a schematic view of components of the compressor/expander subsystem 100 for the compressed gas energy storage system 10 described herein, according to an embodiment. In this example, the compressor/expander subsystem 100 includes a compressor 112 of single or multiple stages, driven by a motor 110 that is powered, in one alternative, using electricity from a power grid or by a renewable power source or the like, and optionally controlled using a suitable controller 118. Compressor 112 is driven by motor 110 during an accumulation stage of operation, and draws in atmospheric air A, compresses the air, and forces it down into gas conduit 22 for storage in accumulator 12 (via thermal storage subsystem 120 (see FIG. 6 for example) in embodiments including same). Compressor/expander subsystem 100 also includes an expander 116 driven by compressed air exiting from gas conduit 22 during an expansion stage of operation and, in turn, driving generator 114 to generate electricity. After driving the expander 116, the expanded air is conveyed for exit to the atmosphere A. While shown as separate apparatuses, the compressor 112 and expander 116 may be part of a common apparatus, as can a hybrid motor/generator apparatus. Optionally, the motor and generator may be provided in a single machine.

Air entering or leaving compressor/expander subsystem 100 may be conditioned prior to its entry or exit. For example, air exiting or entering compressor/expander subsystem 100 may be heated and/or cooled to reduce undesirable environmental impacts or to cause the air to be at a temperature suited for an efficient operating range of a particular stage of compressor 112 or expander 116. Controller 118 operates compressor/expander subsystem 100 so as to switch between accumulation and expansion stages as required, including operating valves for preventing or enabling release of compressed air from gas conduit 22 on demand.

Optionally, the bulkhead 24 may include one or more apertures or other suitable structures to accommodate the gas conduit 22, the liquid conduit 40 and other such conduits, such that the conduits pass through the bulkhead 24 to enter the interior 23 of the accumulator 12. Passing the conduits and other such structures through the bulkhead 24 may eliminate the need to make additional shafts/bores to reach the accumulator 12, and may reduce the number of individual openings required in the upper wall 13. Referring to FIGS. 2-4, extending through main body 25 is a first aperture 28 for accommodating passage of gas conduit 22 from above bulkhead 24 in shaft 18 through to gas layer 14 within accumulator 12. Gas conduit 22 is preferably sealed to/within first aperture 28 to minimize, and preferably prevent, leaks or other uncontrolled release of compressed gas within accumulator 12 into shaft 18 or water 20 within shaft 18 into accumulator 12. Also extending through bulkhead 24 is a second aperture 32 for accommodating passage of liquid conduit 40 from above bulkhead 24 in shaft 18 through to liquid layer 16 within accumulator 12. Liquid conduit 40 is sealed within second aperture 32 to minimize, and preferably prevent, uncontrolled release of compressed gas within accumulator 12 into shaft 18 or water 20 within shaft 18 into accumulator 12 (except via conduit 40).

In this embodiment, an openable and re-sealable access manway 30 is provided for enabling maintenance access by maintenance personnel to the interior of accumulator 12, for inspection and cleaning. This would be done by closing flow control valve 59 (FIG. 1) and emptying shaft 18 of liquid 20, and emptying accumulator 12 of compressed gas thereby to enable manway 30 to be opened and personnel to pass back and forth. As for bulkhead 24, variations are possible. For example, in an alternative embodiment, bulkhead 24 may only have first and second apertures 28, 32 but no manway 30. In an alternative embodiment, bulkhead 24 may include a manway 30, but need not contain first and second apertures 28, 32 and the conduits 22 and 40 do not pass through bulkhead 24. In yet another alternative embodiment, bulkhead 24 contains no manway and no apertures, such that fluid communication with accumulator 12 does not pass through bulkhead 24. Optionally, a manway or the like may also be provided in other types of partitions, including for example the projection 200A as shown in the embodiment of FIG. 17.

Optionally, some embodiments of the compressed gas energy storage system may include a thermal storage subsystem that can be used to absorb heat from the compressed gas that is being directed into the accumulator 12 (i.e. downstream from the compressor 112), sequester at least a portion of the thermal energy for a period, and then, optionally, release at least a portion of the sequestered heat back into gas that is being extracted/released from the accumulator 12 (i.e. upstream from the expander 116). In such examples, the gas may exit the compressor/expander subsystem 100, after being compressed, at an exit temperature of between about 180° C. and about 300° C. and may be cooled by the thermal storage subsystem to an accumulator temperature that is less than the exit temperature, and may be between about 30° C. and about 60° C. in some examples.

Figure 6:
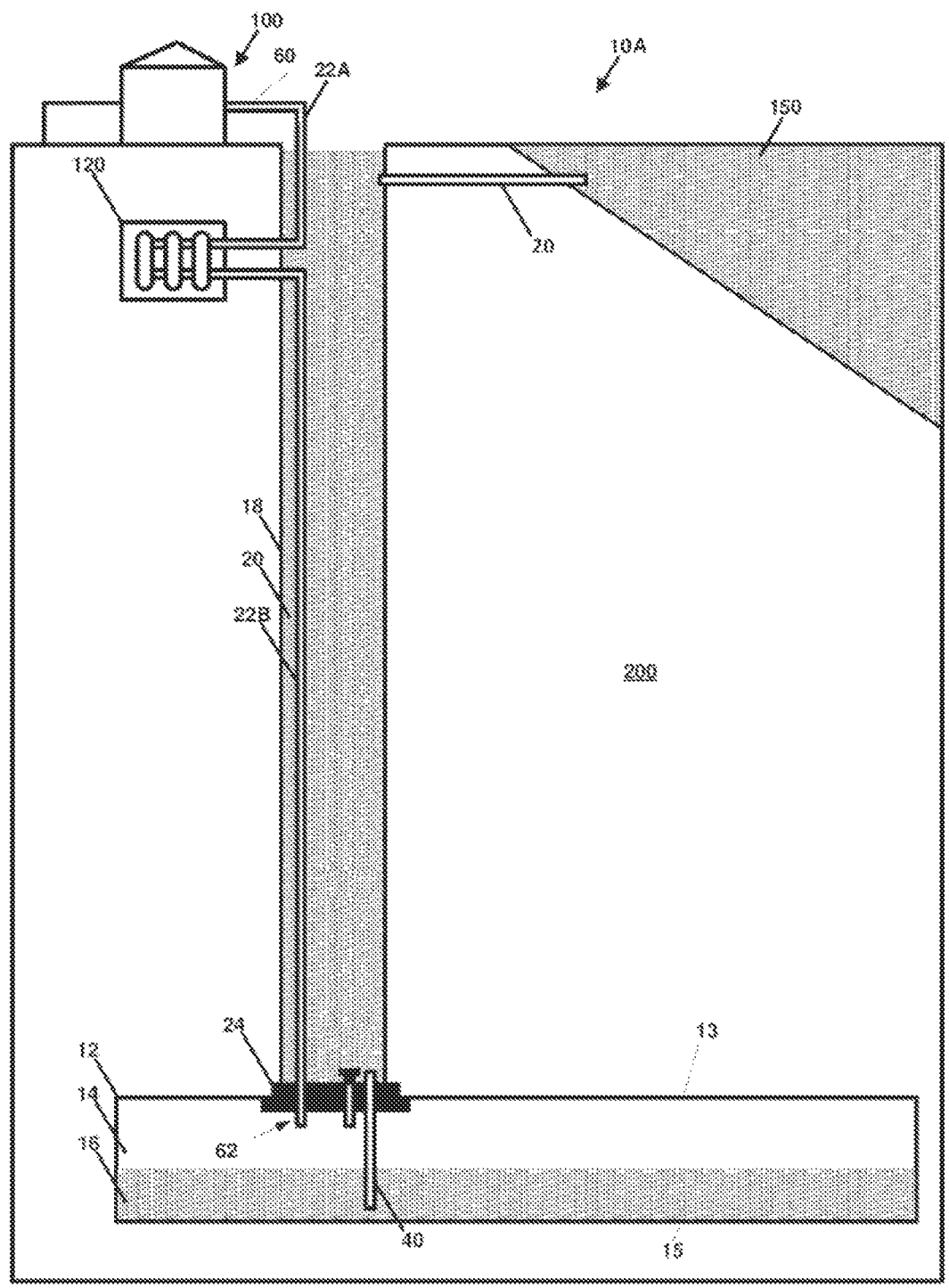
FIG. 6 is a schematic, cross-sectional view of components of another example of a compressed gas energy storage system.

FIG. 6 is a schematic view of components of a compressed gas energy storage system 10A, according to an alternative embodiment. Compressed gas energy storage system 10A is like compressed gas energy storage systems 10, with the addition of a thermal storage subsystem 120 that is provided in the gas flow path between the compressor/expander subsystem 100 and the accumulator 12. In this example, the gas conduit 22 that conveys the compressed gas between the compressed gas layer 14 and compressor/expander subsystem 100 includes an upper portion 22A that extends between the compressor/expander subsystem 100 and thermal storage subsystem 120, and a lower portion 22B that extends between thermal storage subsystem 120 and accumulator 12.

The thermal storage subsystem 120 may include any suitable type of thermal storage apparatus, including, for example latent and/or sensible storage apparatuses. The thermal storage apparatus(es) may be configured as single stage, two stage and/or multiple stage storage apparatus(es). Similarly, the thermal storage subsystem 120 may include one or more heat exchangers (to transfer thermal energy into and/or out of the thermal storage subsystem 120) and one or more storage apparatuses (including, for example storage reservoirs for holding thermal storage fluids and the like). Any of the thermal storage apparatuses may be either be separated from or proximate to their associated heat exchanger and may also incorporate the associated heat exchanger in a single compound apparatus (i.e. in which the heat exchanger is integrated within the storage reservoir).

The thermal storage subsystem 120, or portions thereof, may be located in any suitable location, including aboveground, below ground, within the shaft 18, within the accumulator 12, and the like. Optionally, portions of the thermal storage subsystem 120 can be spaced apart from each other and located in different locations. For example, a heat exchanger used in a thermal storage subsystem 120 may be spaced apart from (but fluidly connected to) a corresponding storage apparatus. In such examples, the storage apparatus(es) may be located relatively deep within the ground while the heat exchanger may be relatively shallower and/or may be provided above ground to help facilitate access, etc.

In the illustrated embodiment, substantially the thermal storage subsystem 120 is located underground, which may help reduce the use of above-ground land and may help facilitate the use of the weight of the earth/rock to help contain the pressure in the storage reservoir. That is, the outward-acting pressure within the storage reservoir can be substantially balanced by the inwardly-acting forces exerted by the earth and rock surrounding the first reservoir. In some examples, if a liner or other type of vessel are provided in the storage reservoir such structures may carry some of the pressure load, but are preferably backed-up by and/or supported by the surrounding earth/rock. This can help facilitate pressurization of the storage reservoir to the desired storage pressures, without the need for providing a manufactured pressure vessel that is capable of withstanding the entire pressure differential. In this example, the thermal storage subsystem 120 also employs multiple stages including, for example, multiple sensible and/or latent thermal storage stages such as stages having one or more phase change materials and/or pressurized water, or other heat transfer fluid arranged in a cascade. It will be noted that, if operating the system for partial storage/retrieval cycles, the sizes of the stages may be sized according to the time cycles of the phase change materials so that the phase changes, which take time, take place effectively within the required time cycles.

In general, as gas is compressed by the compressor/expander subsystem 100 during an accumulation cycle and is conveyed for storage towards accumulator 12, the heat of the compressed gas can be drawn out of the compressed gas and into the thermal storage subsystem 120 for sensible and/or latent heat storage. In this way, at least a portion of the heat energy is saved for future use instead of, for example being leached out of the compressed gas into water 20 or in the liquid layer 16, and accordingly substantially lost (i.e. non-recoverable by the system 10).

Similarly, during an expansion cycle as gas is released from accumulator 12 towards compressor/expander subsystem 100 it can optionally be passed through thermal storage subsystem 120 to re-absorb at least some of the stored heat energy on its way to the expander stage of the compressor/expander subsystem 100. Advantageously, the compressed gas, accordingly heated, can reach the compressor/expander subsystem 100 at a desired temperature (an expansion temperature—that is preferably warmer/higher than the accumulator temperature), and may be within about 10° C. and about 60° C. of the exit temperature in some examples, that may help enable the expander to operate within its relatively efficient operating temperature range(s), rather than having to operate outside of the range with cooler compressed gas.

In some embodiments, the thermal storage subsystem 120 may employ at least one phase change material, preferably multiple phase change materials, multiple stages and materials that may be selected according to the temperature rating allowing for the capture of the latent heat. Generally, phase change material heat can be useful for storing heat of approximately 150 degrees Celsius and higher. The material is fixed in location and the compressed air to be stored or expanded is flowed through the material. In embodiments using multiple cascading phase change materials, each different phase change material represents a storage stage, such that a first type of phase change material may change phase thereby storing the heat at between 200 and 250 degrees Celsius, a second type of phase change material may change phase thereby storing the heat at between 175 and 200 degree Celsius, and a third type of phase change material may change phase thereby storing the heat at between 150 and 175 degrees Celsius. One example of a phase change material that may be used with some embodiments of the system includes a eutectic mixture of sodium nitrate and potassium nitrate, or the HITEC® heat transfer salt manufactured by Coastal Chemical Co. of Houston, Texas.

In embodiments of the thermal storage subsystem 120 employing sensible heat storage, pressurized water, or any other suitable thermal storage fluid/liquid and/or coolant, may be employed as the sensible heat storage medium. Optionally, such systems may be configured so that the thermal storage liquid remains liquid while the system is in use, and does not undergo a meaningful phase change (i.e. does not boil to become a gas). For example, such thermal storage liquids (e.g. water) may be pressurized and maintained at an operating pressure that is sufficient to generally keep the water in its liquid phase during the heat absorption process as its temperature rises. Optionally, the pressurized water may be passed through a heat exchanger or series of heat exchangers to capture and return the heat to and from the gas stream that is exiting the accumulator, via conduit 22. Generally, sensible heat storage may be useful for storing heat of temperatures of 100 degrees Celsius and higher. Pressurizing the water in these systems may help facilitate heating the water to temperatures well above 100 degrees Celsius (thereby increasing its total energy storage capability) without boiling.

Optionally, in some embodiments, a thermal storage subsystem 120 may combine both latent and sensible heat storage stages, and may use phase change materials with multiple stages or a single stage. Preferably, particularly for phase change materials, the number of stages through which air is conveyed during compression and expansion may be adjustable by controller 118. This may help the system 10 to adapt its thermal storage and release programme to match desired and/or required operating conditions.

Optionally, at least some of the gas conduit 22 may be external the shaft 18 so that it is not submerged in the water 20 that is held in the shaft 18. In some preferred embodiments, the compressed gas stream will transfer its thermal energy to the thermal storage system 120 (for example by passing through heat exchangers 635 described herein) before the compressed gas travels underground. That is, some portions of the thermal storage subsystem 120 and at least the portion of the gas conduit that extends between the compressor/expander subsystem 100 and the thermal storage subsystem 120 may be provided above ground, as it may be generally desirable in some embodiments to transfer as much excess heat from the gas to the thermal storage subsystem 120, and reduce the likelihood of heat being transferred/lost in the water 20, ground or other possible heat sinks along the length of the gas conduit 22. Similar considerations can apply during the expansion stage, as it may be desirable for the warmed gas to travel from the thermal storage subsystem 120 to the compressor/expander subsystem 100 at a desired temperature, and while reducing the heat lost in transit.

Figure 18:
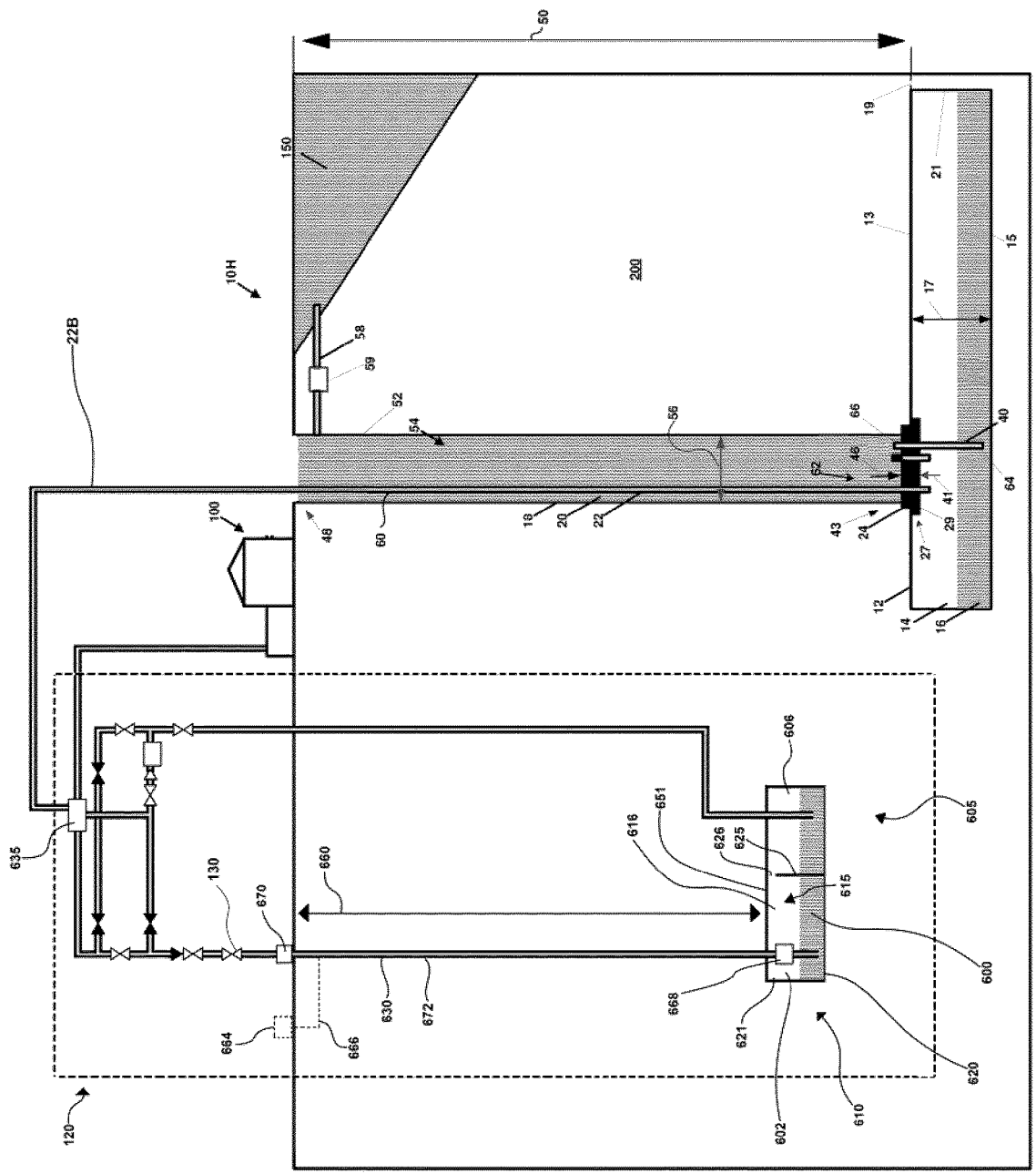
FIG. 18 is a schematic, cross-sectional view of components of yet another example of a compressed gas energy storage system.

Referring to FIG. 18, one example of the thermal storage subsystem 120 that can be used to transfer thermal energy from the compressed gas stream travelling between the gas compressor/expander subsystem 100 and the accumulator 12 is configured to store thermal energy in a thermal storage liquid 600. Optionally, the thermal storage liquid 600 can be pressurized in the thermal storage subsystem 120 to a storage pressure that is higher than atmospheric pressure and may optionally be generally equal to or greater than the accumulator pressure. Harmonizing the storage pressure in the thermal storage subsystem 120 and the accumulator 12 may help facilitate configurations in which there is at least some fluid communication between the thermal storage subsystem 120 and the accumulator 12 (including those described herein). In some examples, the storage pressure may be between about 100% and about 200% of the accumulator pressure.

Pressurizing the thermal storage liquid 600 in this manner may allow the thermal storage liquid 600 to be heated to relatively higher temperatures (i.e. store relatively more thermal energy and at a more valuable grade) without boiling, as compared to the same liquid at atmospheric pressure. That is, the thermal storage liquid 600 may be pressurized to a storage pressure and heated to a thermal storage temperature such that the thermal storage liquid 600 is maintained as a liquid while the system is in use (which may help reduce energy loss through phase change of the thermal storage liquid). In the embodiments illustrated, the storage temperature may be between about 150 and about 500 degrees Celsius, and preferably may be between about 150 and 350 degrees Celsius. The storage temperature is preferably below a boiling temperature of the thermal storage liquid 600 when at the storage pressure but may be, and in some instances preferably will be the above boiling temperature of the thermal storage liquid 600 if it were at atmospheric pressure. In this example, the thermal storage liquid 600 can be water, but in other embodiments may be engineered heat transfer/storage fluids, coolants, oils and the like. When sufficiently pressurized, water may be heated to a storage temperature of about 250 degrees Celsius without boiling, whereas water at that temperature would boil at atmospheric pressure.

Optionally, the thermal storage liquid 600 can be circulated through a suitable heat exchanger to receive heat from the compressed gas stream travelling through the gas supply conduit 22 (downstream from the compressor/expander subsystem 100). The heated thermal storage liquid 600 can then be collected and stored in a suitable storage reservoir (or more than one storage reservoirs) that can retain the heated thermal storage liquid 600 and can be pressurized to a storage pressure that is greater than atmospheric pressure (and may be between about 10 and 60 bar, and may be between about 30 and 45 bar, and between about 20 and 26 bar).

The storage reservoir may be any suitable type of structure, including an underground chamber/cavity (e.g. formed within the surrounding ground 200) or a fabricated tank, container, a combination of a fabricated tank and underground chamber/cavity, or the like. If configured to include an underground chamber, the chamber may optionally be lined to help provide a desired level of liquid and gas impermeability and/or thermal insulation. For example, underground chambers may be at least partially lined with concrete, polymers, rubber, plastics, geotextiles, composite materials, metal and the like. Configuring the storage reservoir to be at least partially, and preferably at least substantially impermeable may help facilitate pressurizing the storage reservoir as described herein. Fabricated tanks may be formed from any suitable material, including concrete, metal, plastic, glass, ceramic, composite materials and the like. Optionally, the fabricated tank may include concrete that is reinforced using, metal, fiber reinforced plastic, ceramic, glass or the like, which may help reduce the thermal expansion difference between the concrete and the reinforcement material.

Referring still to FIG. 18, in this embodiment the storage reservoir 610 of the thermal storage subsystem 120 includes a chamber 615 that is positioned underground, at a reservoir depth 660. Preferably, the reservoir depth 660 is less than the depth of the accumulator 12, which in this example corresponds to the shaft height 50. Optionally, the thermal storage subsystem 120 can be configured so that the reservoir depth 660 is at least about ⅓ of the accumulator depth/shaft height 50, or more. For example, if the accumulator 12 is at a depth of about 300 m, the reservoir depth 660 is preferably about 100 m or more. For example, having the reservoir depth 660 being less than the accumulator depth 50 may help facilitate sufficient net positive suction head to be available to the fluid transfer pumps and other equipment utilized to pump the thermal storage liquid 600 through the thermal storage subsystem 120 (for example between source reservoir 606 and storage reservoir 610). This may allow the transfer pumps to be positioned conveniently above ground and may help reduce the chances of damaging cavitation from occurring.

The reservoir depth 660 being at least ⅓ the depth 50 of the accumulator 12 may also allow for relatively higher rock stability of the subterranean thermal storage cavern, such as chamber 615. The geostatic gradient, which provides an upper limit on pressure inside underground rock caverns, is typically about 2.5-3 times the hydrostatic gradient. Given this rock stability criterion, the shallowest reservoir depth 660 may be approximately three times less than the accumulator depth in some embodiments, such as when the storage pressure is generally equal than the accumulator pressure.

In this example, the chamber 615 is a single chamber having a chamber interior 616 that is at least partially defined by a bottom chamber wall 620, a top chamber wall 651, and a chamber sidewall 621. The chamber 615 is connected to one end of a liquid inlet passage 630 (such as a pipe or other suitable conduit) whereby the thermal storage liquid 600 can be transferred into and/or out of the chamber 615. In addition to the layer of thermal storage liquid 600, a layer of cover gas 602 is contained in the chamber 615 and overlies the thermal storage liquid 600. Like the arrangement used for the accumulator 12, the layer of cover gas 602 can be pressurized using any suitable mechanism to help pressurize the interior of the chamber 615 and thereby help pressurize the thermal storage liquid 600. The cover gas may be any suitable gas, including air, nitrogen, thermal storage liquid vapour, an inert gas and the like. Optionally, at least the subterranean portions of the liquid inlet passage 630 (i.e. the portions extending between the heat exchanger 635 and the storage reservoir 610) may be insulated (such as by a vacuum sleeve, or insulation material) to help reduce heat transfer between the thermal storage fluid and the surrounding ground.

When the thermal storage subsystem 120 is in use, a supply of thermal storage liquid can be provided from any suitable thermal storage liquid source 605. The thermal storage liquid source can be maintained at a source pressure that may be the same as the storage pressure, or may be different than the storage pressure. For example, the thermal storage liquid source may be at approximately atmospheric pressure, which may reduce the need for providing a relatively strong, pressure vessel for the thermal storage liquid source. Alternatively, the thermal storage liquid source may be pressurized. The thermal storage liquid source may also be maintained at a source temperature that is lower, and optionally substantially lower than the storage temperature. For example, the thermal storage liquid source may be at temperatures of between about 2 and about 100 degrees Celsius, and may be between about 4 and about 50 degrees Celsius. Increasing the temperature difference between the incoming thermal storage liquid from the source and the storage temperature may help increase the amount of heat and/or thermal energy that can be stored in the thermal storage subsystem 120.

Figure 19:
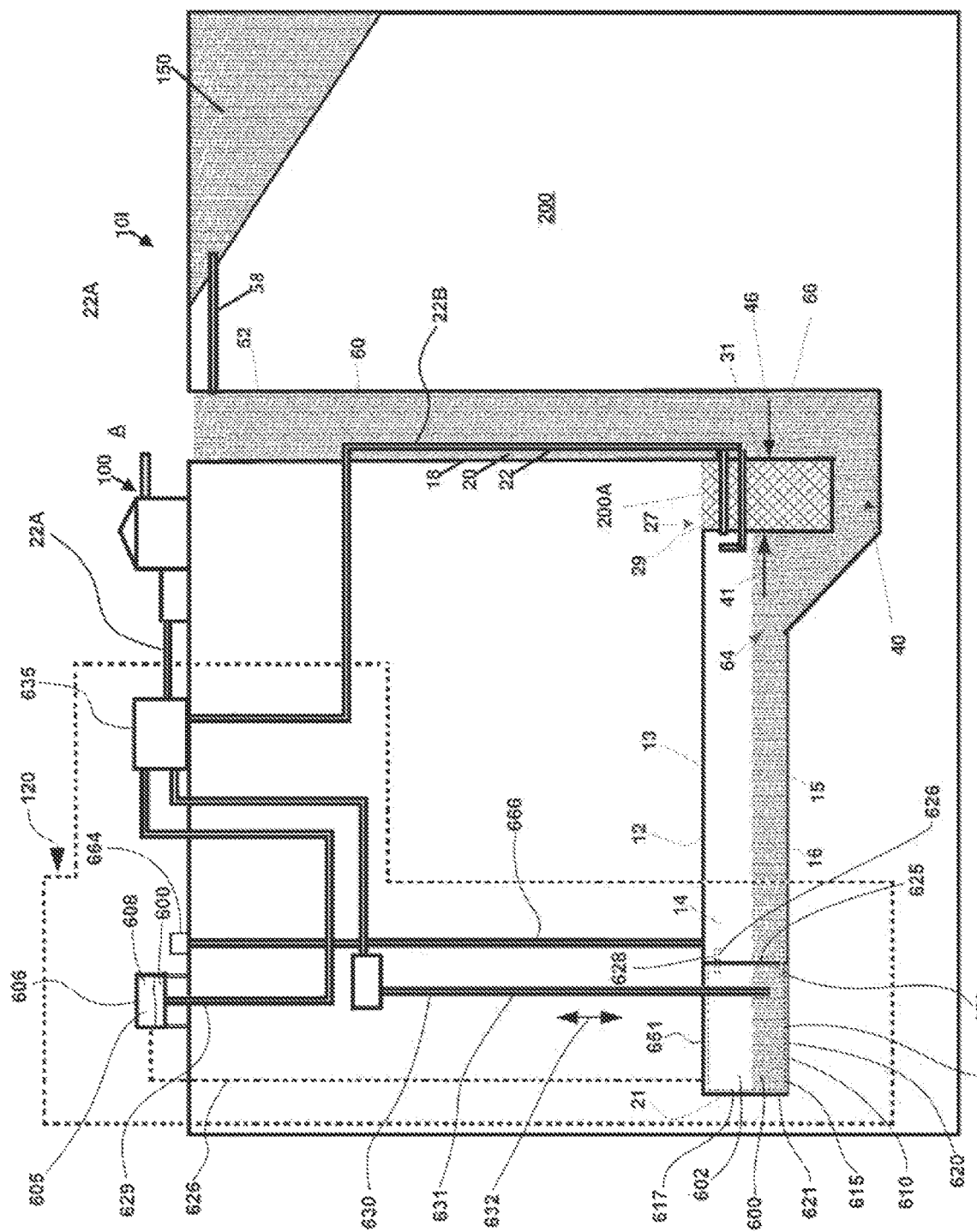
FIG. 19 is a schematic, cross-sectional view of components of yet another example of a compressed gas energy storage system.

The thermal storage liquid source 605 may have any suitable configuration, and may have the same construction as an associated storage reservoir, or may have a different configuration. For example, in the embodiment of FIG. 18 the thermal storage liquid source 605 includes a source reservoir 606 that is configured in the same underground chamber as the thermal fluid storage chamber 615. In this arrangement, a closed loop system can be provided, including the storage reservoir 610 and the source reservoir 606. Alternatively, as shown in the embodiment of FIG. 19, the thermal storage liquid source 605 may include a source reservoir 606 that is configured as an above-ground vessel, and optionally need not be pressurized substantially above atmospheric pressure. In other embodiments, the thermal liquid source 605 may include a body of water such as the lake 150, water 20 from the shaft 18, liquid from the liquid layer 16 in the accumulator 12 (or from any other portion of the overall system 10), water from a municipal water supply or other such sources and combinations thereof.

In the embodiment of FIG. 18, the source reservoir 606 and storage reservoir 610 are adjacent each other, and are portions of a generally common underground chamber. This may help simplify construction of the thermal storage subsystem 120 as an excavation of a single chamber may provide space for both the source reservoir 606 and storage reservoir 610. This may also help simplify piping and valving between the source reservoir 606 and the storage reservoir 610.

In some examples, the interiors of the storage reservoir 610 and source reservoir 606 may be substantially fluidly isolated from each other, such that neither gas nor liquid can easily/freely pass between reservoirs 606 and 610. One example of a subsystem 120 having this arrangement is shown in FIG. 19.

Alternatively, as illustrated in FIG. 18, the interiors of the storage reservoir 610 and source reservoir 606 may be in gas flow communication with each other, such as by providing the gas exchange passage 626 that can connect the layer of cover gas 602 with a layer of cover gas 608 in the source reservoir 606. The gas exchange passage 626 can be configured to allow free, two-way flow of gas between the storage reservoir 610 and the source reservoir 606, or may be configured to only allow one-way gas flow (in either direction). Providing a free flow of gas between the storage reservoir 610 and the source reservoir 606 may help automatically match the pressures within the storage reservoir 610 and the source reservoir 606. Preferably, when arranged in this manner, the interior of the storage reservoir 610 remains at least partially isolated from the interior of the source reservoir 606 during normal operation to inhibit, and preferably prevent mixing of the relatively hot cover gas 602 associated with the thermal storage liquid 600 in the storage reservoir 610 with the relatively cooler cover gas 608 associated with the thermal storage liquid in the source reservoir 606. In this example, the storage reservoir 610 and source reservoir 606 share a common sidewall, which can function as an isolating barrier 625 to prevent liquid mixing between the reservoirs. This common sidewall may be insulated to prevent unwanted heat transfer from the relatively hot thermal storage liquid 600 in the storage reservoir 610 to the relatively cooler thermal storage liquid in the source reservoir 606

When the compressed gas energy storage system 10H is in a charging mode, compressed gas is being directed into the accumulator 12 and the thermal storage liquid 600 can be drawn from the thermal storage liquid source 605, passed through one side of a suitable heat exchanger 635 (including one or more heat exchanger stages) to receive thermal energy from the compressed gas stream exiting the compressor/expander subsystem 100, and then conveyed/pumped through the liquid inlet passage 630 and into the storage reservoir 610 for storage at the storage pressure.

When the compressed gas energy storage system is in a storage mode, compressed gas is neither flowing into or out of the accumulator 12 or thorough the heat exchanger 635, and the thermal storage liquid 600 need not be circulated through the heat exchanger 635.

When the compressed gas energy storage system 10H is in a discharging mode, compressed gas is being transferred from the accumulator 12 and into the compressor/expander subsystem 100 for expansion and the thermal storage liquid 600 can be drawn from the storage reservoir 610, passed through one side of a suitable heat exchanger 635 (including one or more heat exchanger stages) to transfer thermal energy from thermal storage liquid into the compressed gas stream to help increase the temperature of the gas stream before it enters the compressor/expander subsystem 100. Optionally, the thermal storage fluid can then be conveyed/pumped into the source reservoir 606 for storage.

When the compressed gas energy storage system 10I is in charging mode the thermal storage liquid 600 receives thermal energy from the compressed gas is conveyed into the storage reservoir 610, and while the thermal storage system 10I is in discharging mode the storage liquid 600 is drawn from the storage reservoir 600 and transfers thermal energy into the compressed gas exiting the accumulator 12 (preferably before it reaches the compressor/expander subsystem 100).

The thermal storage liquid 600 can be conveyed through the various portions of the thermal storage subsystem 120 using any suitable combination of pumps, valves, flow control mechanisms and the like. Optionally, an extraction pump may be provided in fluid communication with, and optionally at least partially nested within, the storage reservoir 610 to help pump the thermal storage liquid 600 from the storage reservoir 610 up to the surface. Such a pump may be a submersible type pump and/or may be configured so that the pump and its driving motor are both located within the storage reservoir 610. Alternatively, the pump may be configured as a progressive cavity pump having a stator and rotor assembly 668 (including a rotor rotatably received within a stator) provided in the storage reservoir 610 and positioned to be at least partially submerged in the thermal storage liquid 600, a motor 670 that is spaced from the stator and rotor assembly 668 (on the surface in this example) and a drive shaft 672 extending therebetween. In this example, the drive shaft 672 is nested within the liquid inlet passage 630 extending to the storage reservoir 610, but alternatively may be in other locations.

Optionally, to help pressurize the storage reservoir 610, the thermal storage subsystem 120 may include any suitable type of pressurization system, and may include a thermal storage compressor system that can help pressurize the layer of cover gas 602 in the storage reservoir. This may include a thermal storage compressor 664, as shown in in FIGS. 18 and 19 for example,) that is in fluid communication with the cover gas layer 602. The compressor itself may be on the surface, and may be connected to the cover gas layer 602 by a compressor gas conduit 666 that may be spaced from, or at least partially integrated with the liquid inlet passage 630. Optionally, the compressor 664 may be configured to raise the pressure of the cover gas layer 602 from atmospheric pressure to the storage pressure. The compressor 664, and any other aspects of the thermal storage subsystem 120 may be controlled at least partially automatically by the controller 118. While shown as a separate compressor 664, pressure for the storage reservoir 610 may at least partially be provided by the compressor/expander subsystem 100.

Optionally, as shown in the examples of FIGS. 19 and 21, the cover gas layer 602 may be in fluid communication with the compressed gas layer 14 in the accumulator 12, for example via the gas exchange passage 626. In such examples, pressuring the accumulator 12 can also cause the simultaneous pressurization of the storage reservoir 610, and raise the pressure of the cover gas layer 602 to the accumulator pressure. In embodiments where the storage reservoir 610 is to be pressurized to the same pressure as the accumulator, this may be sufficient pressurization of the storage reservoir 610.

Alternatively, if the storage pressure is to be higher than the accumulator pressure, the thermal storage subsystem 120 may include a valve, one-way flow control device or other such flow limiting device that can allow gas to move from the accumulator 12 into the storage reservoir 610 to pressurize the storage reservoir 610 to the accumulator pressure, and can prevent gas from travelling from escaping from the storage reservoir 610 to the accumulator 12. This may allow the storage reservoir 610 to be at least partially pressurized by the gas layer 14 of the accumulator 12, and then isolated and further pressurized using a suitable pressurization system (such as the compressor 664).

In other embodiments, the storage reservoir 610, and cover gas layer 602 therein, may be pressurized using other means, including, other mechanical compression mechanisms and may optionally be at least partially self pressurizing. That is, the storage reservoir 610 may begin at relatively low pressure and as the thermal storage liquid 600 is heated a relatively small portion of the thermal storage liquid 600 may boil and convert to a vapour phase. The vapour may then form at least part of the cover gas layer 602, and may increase the pressure within the storage reservoir 610 to a generally equilibrium pressure such that further boiling, at a given temperature, is inhibited. As the temperature of the thermal storage liquid 600 continues to rise, additional amounts of the thermal storage liquid 600 may convert to vapour phase thereby increasing the overall pressure of the storage reservoir 610 and reaching a new equilibrium with the liquid phase. This may be sufficient to pressurize the storage reservoir 610 to the storage pressure, or the subsystem 120 may also include one or more additional pressurization systems, including any of those described herein.

In the example of FIG. 19, the thermal storage liquid source 605, e.g. the source reservoir 606 is located above ground and storage reservoir 610 is located underground and is adjacent to the accumulator 12. In this arrangement, the depth of the storage reservoir 610 is the same as the depth of the accumulator 12. To keep the thermal storage liquid 600 separate from the liquid layer 16, there is an isolating barrier 625. Optionally, the chamber interior 616 may be at least partially covered in a storage liner 617 that is preferably substantially vapour and liquid impermeable at the storage pressure.

In this embodiment, the isolating barrier 625 includes a gas exchange passage 626 that allows the pressurized layer of cover gas 602 to communicate with gas layer 14 within the accumulator 12, which allows the mixing of gas 602 and gas layer 14 which allows the storage reservoir 610 to be at least partially pressurized when the accumulator 12 is pressurized. Optionally, fluid communication through the gas exchange passage 626 can be directionally controlled by a flow regulator 628 (e.g. a check valve) such that, for example, pressurized layer of cover gas 602 cannot enter the accumulator 12 through the gas exchange passage 626, but gas 14 from the accumulator 12 can enter the chamber 615 of the storage reservoir 610 allowing the gas 14 in the accumulator to initially pressurize the first storage reservoir 610. This may allow the storage reservoir 610 to be at least partially pressurized by the gas layer 14 of the accumulator 12, and then isolated and further pressurized using a suitable pressurization system (such as the compressor 664).

In this embodiment, the liquid inlet passage 630 includes an upper liquid inlet passage 629 and a lower liquid inlet passage 631. When the compressed energy storage system 10I is in a charging mode, the upper liquid inlet passage 629 conveys thermal storage liquid 600 from the source reservoir 606 to a first heat exchanger 635 where it is heated to a storage temperature (below a boiling temperature of the thermal storage liquid when at the storage pressure and is the above boiling temperature of the thermal storage liquid when at atmospheric pressure) before the lower liquid inlet passage 631 conveys the thermal storage liquid heated to a storage temperature to the first storage reservoir 610. For greater certainty only, the thermal storage fluid 600 in the source reservoir 606 is at a source temperature that is less than the storage temperature described above. An analogous configuration may be used in other embodiments.

When the compressed gas energy storage system 10I is in a discharging mode, compressed gas is being transferred from the accumulator 12 and into the compressor/expander subsystem 100 for expansion and the thermal storage liquid 600 can be drawn from the storage reservoir 610, passed through one side of a suitable heat exchanger 635 (including one or more heat exchanger stages) to transfer thermal energy from thermal storage liquid into the compressed gas stream to help increase the temperature of the gas stream before it enters the compressor/expander subsystem 100, as illustrated by arrow 632 Optionally, the thermal storage fluid can then be conveyed/pumped into the source reservoir 606 for storage.

Optionally, in some embodiments the storage reservoir 610 may include an outer chamber or shell portion that is configured to withstand the desired pressurization described herein, and at least one inner chamber that is configured to receive and retain the heated thermal storage liquid, and optionally may include two or more inner chambers within a common outer chamber. In some examples, the interior of the inner chamber may be in fluid communication with the interior of the outer chamber. This may allow the inner chamber to retain the thermal transfer fluid without having to be a pressure-bearing vessel or otherwise carry a substantial pressure differential across the boundary of the inner chamber. For example, the outer chamber may be a chamber formed in the ground. Such a chamber may be strong enough to withstand the intended operating pressures of the thermal storage system 120, but may not be the preferred configuration for directly contacting and retaining the thermal storage fluid. To help provide the desired liquid storage, an inner chamber in the form of a tank or other liquid retaining vessel may be positioned inside the outer chamber. The heated thermal storage liquid can then be stored in the tank, under an associated cover gas layer. The upper end of the tank may be at least partially open, such that the cover gas layer in the inner chamber is in communication with, and is therefore at the same pressure as the cover gas layer of the outer chamber. In this arrangement, the inner tank need not carry a substantial pressure load (simply the hydrostatic pressure exerted by the quantity of thermal storage liquid in the tank), and therefore may be of relatively light construction, as compared to a pressure-bearing vessel that would be required to withstand the storage pressure. In some examples, two or more separate tanks may be placed within a common outer chamber, and may be maintained at a common pressure in this manner.

Figure 20A:
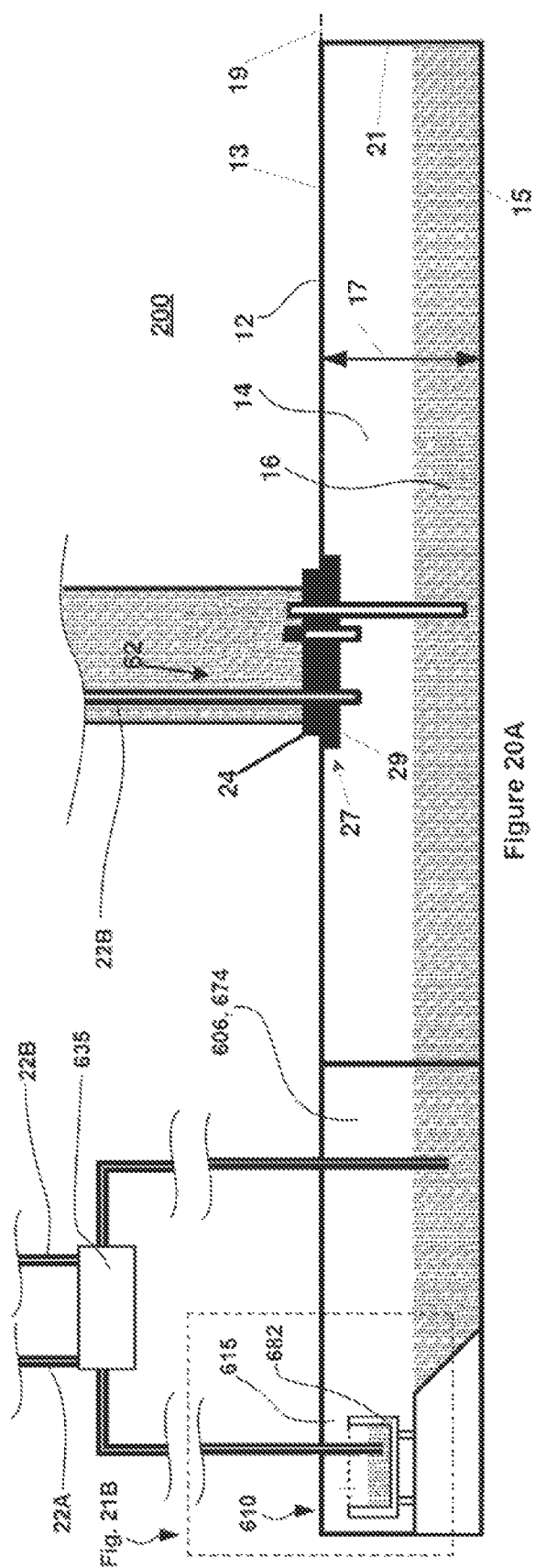
FIG. 20A is a schematic, cross-sectional view of components of yet another example of a compressed gas energy storage system.
Figure 20B:
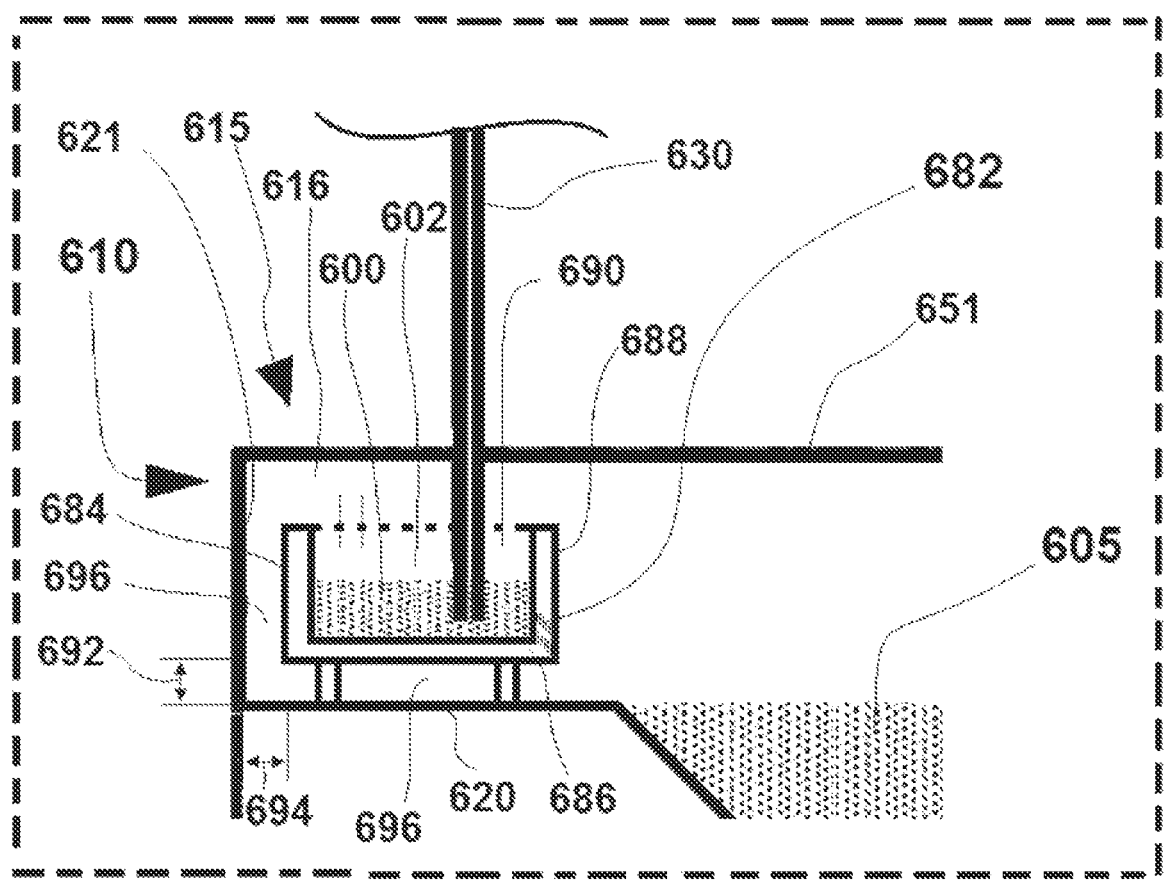
FIG. 20B is an enlarged view of a portion of the compressed gas energy storage system of FIG. 20A.

Referring to FIGS. 20A and 20B, in this example the storage reservoir 610 includes an outer chamber 615 that has a chamber interior 616 that is at least partially defined by a bottom chamber wall 620, an upper chamber wall 651, and a chamber sidewall 621. An inner chamber includes a tank 684 that is disposed within the chamber interior 616, and includes a tank bottom wall 686 and a tank sidewall 688 which together help define a tank interior 690. The thermal storage liquid 600 and layer of cover gas 602 are contained within the tank 684. The upper end of the tank 684 is open in this example, providing fluid communication between the chamber interior 616 and cover gas layer 602. The tank 684 may be made from any suitable material, including, for example, metal, concrete, plastic, glass, ceramic, composite materials and combinations thereof. The tank 684 is preferably liquid impermeable, but need not be vapour impermeable.

In this arrangement the storage pressure is carried by the relatively strong walls 620, 651, and 621 of the outer chamber 615, and optionally the tank 684 need not be strong enough to withstand the full storage pressure.

Optionally, the tank bottom wall 686 can be spaced above the chamber bottom wall 620 by a offset height 692. Similarly, the tank side wall 688 may be spaced inwardly from the chamber sidewall 621 by an offset distance 694. This may help provide thermal insulation of the tank 684 by surrounding it with gas, and may allow the tank 684 to have a desired shape that can be different than the shape/contour of the chamber bottom wall 620 and chamber sidewall 621. The offset height and distance 692 and 694 may be any suitable distance, and may be between 10 cm and about 10 m or more.

Optionally, the thermal storage subsystem 120 may be configured to provide at least some degree of thermal insulation between the heated thermal storage liquid 600 in the first reservoir 610 and the surrounding environment. For example, if the storage reservoir 610 is configured as an underground chamber in which the thermal storage liquid 600 is in contact with the chamber walls (i.e. surrounding rock), heat may be transferred from the thermal storage liquid 600 to the surrounding ground/rock. Providing thermal insulation may help reduce the amount of heat that escapes from the thermal storage liquid 600 while it is being stored. This may help prevent thermal stresses from developing in the rock and thereby help to improve the cavern stability. Similarly, this may also help improve the overall efficiency of the thermal storage subsystem 120 and/or system 10. Preferably, the thermal storage subsystem 120 may include at least one thermal insulation layer, that may include one or more layers of physical insulating material (such as fiberglass, plastic, refractory material, ceramic and the like) and/or one or more gas layers and/or one or more vacuum layers between the high temperature thermal storage liquid in the storage reservoir and the ambient environment.

To help provide such thermal insulation, the chamber walls (e.g. bottom 620 and sidewall 621) in the embodiments described may be provided with a layer of insulating material. Alternatively, or in addition to such insulation, embodiments that utilize a separate inner chamber, such as the tank 684 in the embodiment of FIGS. 20A and 20B may be configured to include gaps 696 due to offset distances 692 and 694 in which air, or any other suitable gas, may collect. Such air gaps may function as bottom and sidewall insulting gas layers, as direct contact, and the associated conductive heat transfer, between the tank walls 686 and 688 and the chamber walls 620 and 621 is substantially eliminated. Such embodiments may also utilize one or more layers of physical insulating material on the various walls of the inner chamber 684.

Optionally, the thermal storage subsystem 120 may include a reservoir cooling system that can be selectably operated to reduce the temperature of the storage reservoir 610. The reservoir cooling system may be at least partially automatically controlled by the controller 118 (or analogous controller) based on characteristics of the thermal storage subsystem 120, such as temperatures and/or pressures within the storage reservoir that are above a pre-determined upper threshold.

The reservoir cooling system may include any type of closed loop cooling system, including heat exchangers and the like. It may also be operable to introduce relatively cold liquid into the storage reservoir 610 to directly mix with the thermal storage liquid 600 or onto the outer chamber or inner chamber walls to provide surface cooling, and/or may be operable to drain at least some of the hot thermal storage liquid 600 from the storage reservoir 610 into a secondary cooling/mixing chamber. Providing a direct mixing and/or draining of liquid from within the storage reservoir 610 may provide relatively fast cooling, and may be well suited for cooling in emergency overheating/over pressurization conditions. Optionally, the reservoir cooling system for the thermal storage subsystem 120 may include a quantity of cooling liquid that is stored at a cooling temperature (that is lower than the storage temperature and may be similar to or the same as the source temperature) in a cooling chamber. The cooling liquid may be the same as the thermal storage liquid 600, or may be a different liquid. The cooling chamber may be the same as the storage reservoir, or the out chamber, or may be the same as the source reservoir, or it may be a different chamber. Optionally, the reservoir cooling system for the thermal storage subsystem 120 may include a gas circulation system which conveys the cover gas 602 to a heat exchanger which exhausts a portion of the thermal energy contained with the cover gas to the environment, such as an aerial cooler.

Figure 22:
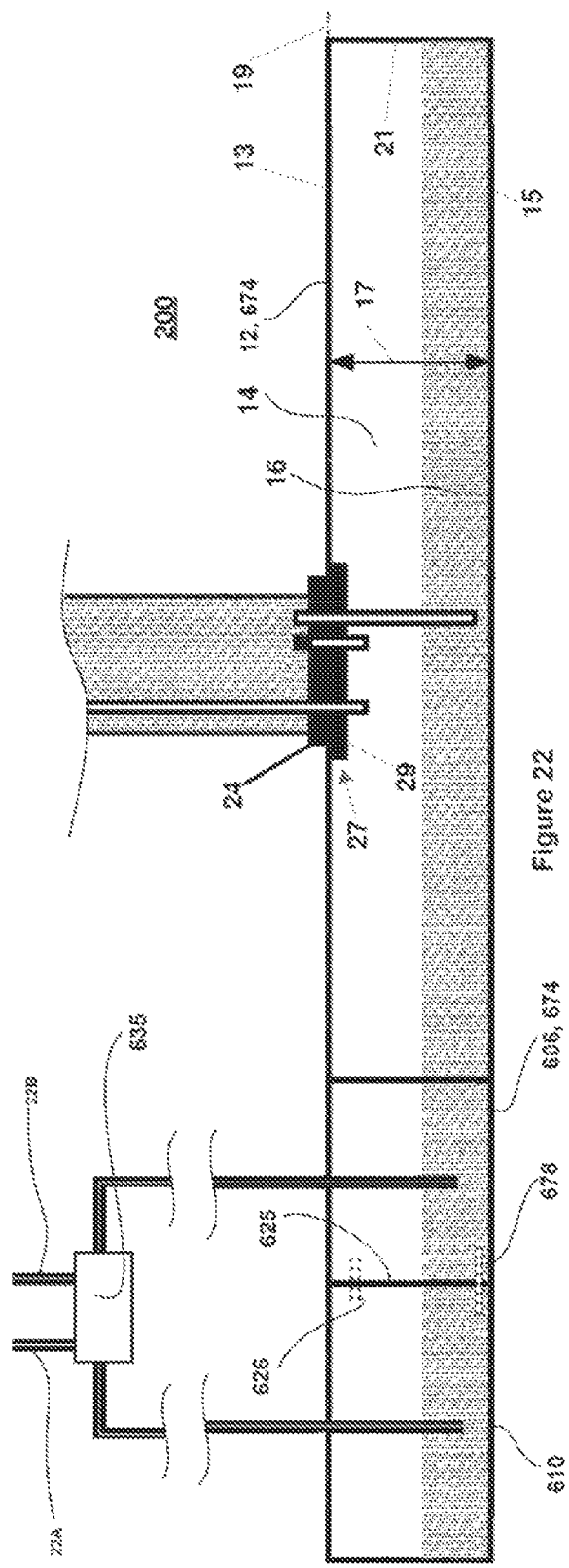
FIG. 22 is a schematic, cross-sectional view of components of yet another example of a compressed gas energy storage system.

Referring to FIG. 21, embodiments of a reservoir cooling system are configured such that the source reservoir 606 functions as a cooling chamber 674, and contains extra thermal storage liquid (not yet heated by the heat exchanger 635) that functions as the cooling liquid. A pump 676 is provided along a cooling liquid conduit 678 (which may also include a valve 680 or other equipment) is provided to introduce at least some of the cooling liquid from the cooling chamber 674 into the storage reservoir 610, thereby diluting and reducing the temperature of the thermal storage liquid 600 in the storage reservoir 610. Alternatively, an automatically opening, pressure-actuated drain valve that is configured to open at a set condition (possibly pressure) could be provided instead of, or in addition to, the pump 676. If the pressure within the storage reservoir 610 exceeded a pre-determined automatic-cooling pressure threshold, the drain valve may automatically open and allow the heated thermal storage liquid to rush out of the storage reservoir 610, and preferably to mix with the cooling liquid. In the example of FIG. 22, the source chamber 606 functions as a cooling chamber 674, and the water layer 16 that functions as the cooling liquid. In this example, a cooling liquid conduit 678 is provided as a conduit that passes through the isolating barrier 625 that can be opened to allow mixing between the heated thermal storage liquid 600 in the storage reservoir 610 and the source chamber 606, which is at a substantially lower temperature. This flow can be one-way, or two-way. In the embodiment of FIG. 19 a cooling liquid conduit 678 is provided as a conduit that passes through the isolating barrier 625 that can be opened to allow mixing between the heated thermal storage liquid 600 in the storage reservoir 610 and layer of water 16 in the accumulator, which is at a substantially lower temperature Referring to FIGS. 20A and 20B, in another embodiment the reservoir cooling system for the thermal storage subsystem 120 includes a drain apparatus 682 that is in communication with the storage reservoir 610 and, in this example, is provided as a drain in the side wall 686 of the tank 684, and can be selectably opened to drain at least some of the thermal storage liquid 600 from the first storage reservoir 610. The drained thermal storage liquid 600 may be directed to any suitable sink/drain, and in the embodiment of FIG. 20A is directed into a cooling chamber that is provided by the source reservoir 605 and contains a quantity of a cooling liquid stored at a cooling temperature that is below the storage temperature, which in this example is unheated thermal storage fluid at the source temperature. Preferably, the cooling chamber can be located at a lower elevation than the storage reservoir 610, such that the thermal storage liquid 600 can flow from the storage reservoir 610 into the cooling chamber under the influence of gravity, and optionally without the need for a pump or other conveying mechanism. This may help facilitate operation of the reservoir cooling system, and may enable the thermal storage liquid 600 to be drained even if electrical power is not available.

FIG. 22 illustrates an alternative embodiment of a thermal storage subsystem 120 in which both the storage reservoir 610 and the source reservoir 606 are adjacent and to the accumulator 12. The heat exchanger 635 is spaced from the accumulator 12, and may preferably be provided above ground.

Figure 23:
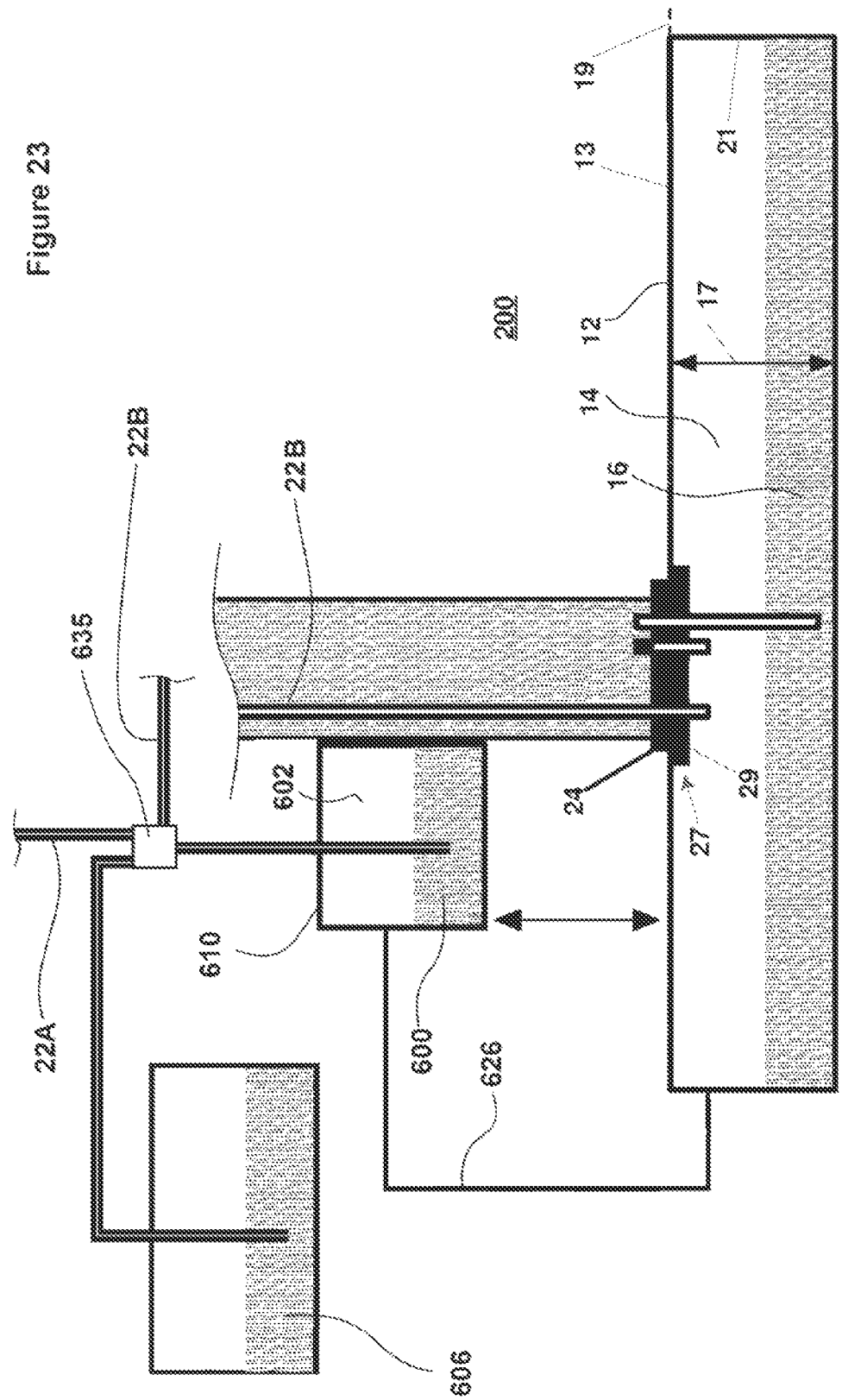
FIG. 23 is a schematic, cross-sectional view of components of yet another example of a compressed gas energy storage system.

FIG. 23 illustrates an alternative embodiment of a thermal storage subsystem 120 in which both the storage reservoir 610 and the source reservoir 606 are spaced apart from each other and from the accumulator 12, and are both positioned below ground. In this arrangement, the storage reservoir 610 is adjacent the shaft 18 and is above the accumulator 12. A gas passage conduit 626 in this example extends from the accumulator 12 to the storage reservoir 610 to provide fluid communication between the gas layer 14 and the cover gas layer 602.

Figure 7:
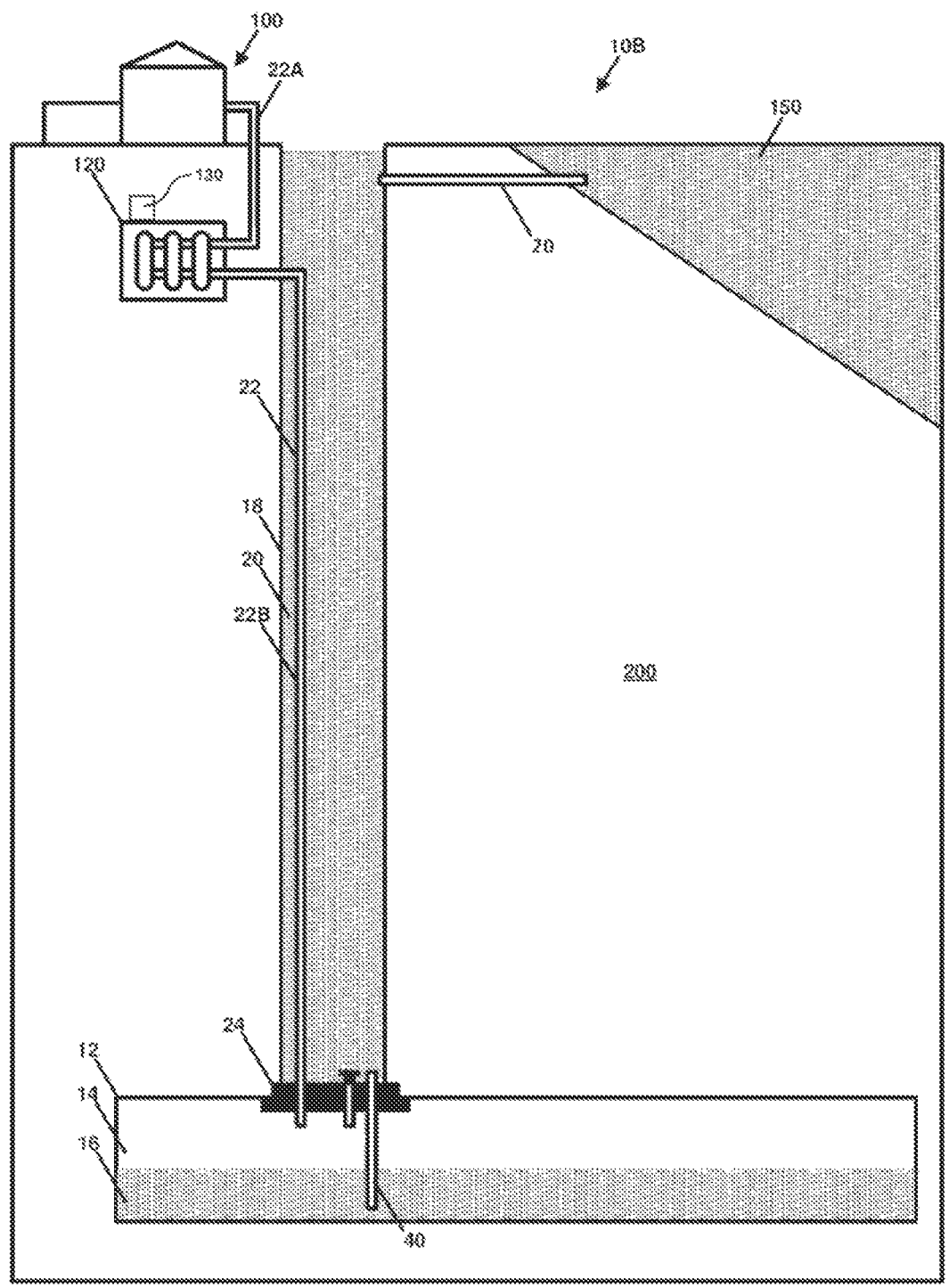
FIG. 7 is a schematic, cross-sectional view of components of another example of a compressed gas energy storage system.

FIG. 7 is a schematic representation of a compressed gas energy storage system 10B, according to an alternative embodiment. Compressed gas energy storage system 10B is similar to the other compressed gas energy storage systems described herein, but is configured so that the upper portion 22A of the gas conduit 22 that conveys compressed gas between the thermal storage subsystem 120 and the compressor/expander subsystem 100 extends through the ground 200, and not through shaft 18 and water 20. Additional variations are possible.

Furthermore, while in embodiments illustrated the thermal storage subsystem 120 receives compressed gas from, or provides compressed gas to, the compressor/expander subsystem 100, alternatives are possible in which thermal storage is more tightly integrated with multiple stages of compressor 112 and multiple stages of expander 116 so as to store thermal energy between stages. This may be done to enable the pieces of equipment at downstream stages of compressor 112 and expander 116 to receive and handle compressed gas at a temperature that is within their most efficient operating ranges. This may help facilitate heat transfer and/or storage at two or more stages in the process, which may help improve system efficiency.

Figure 8:
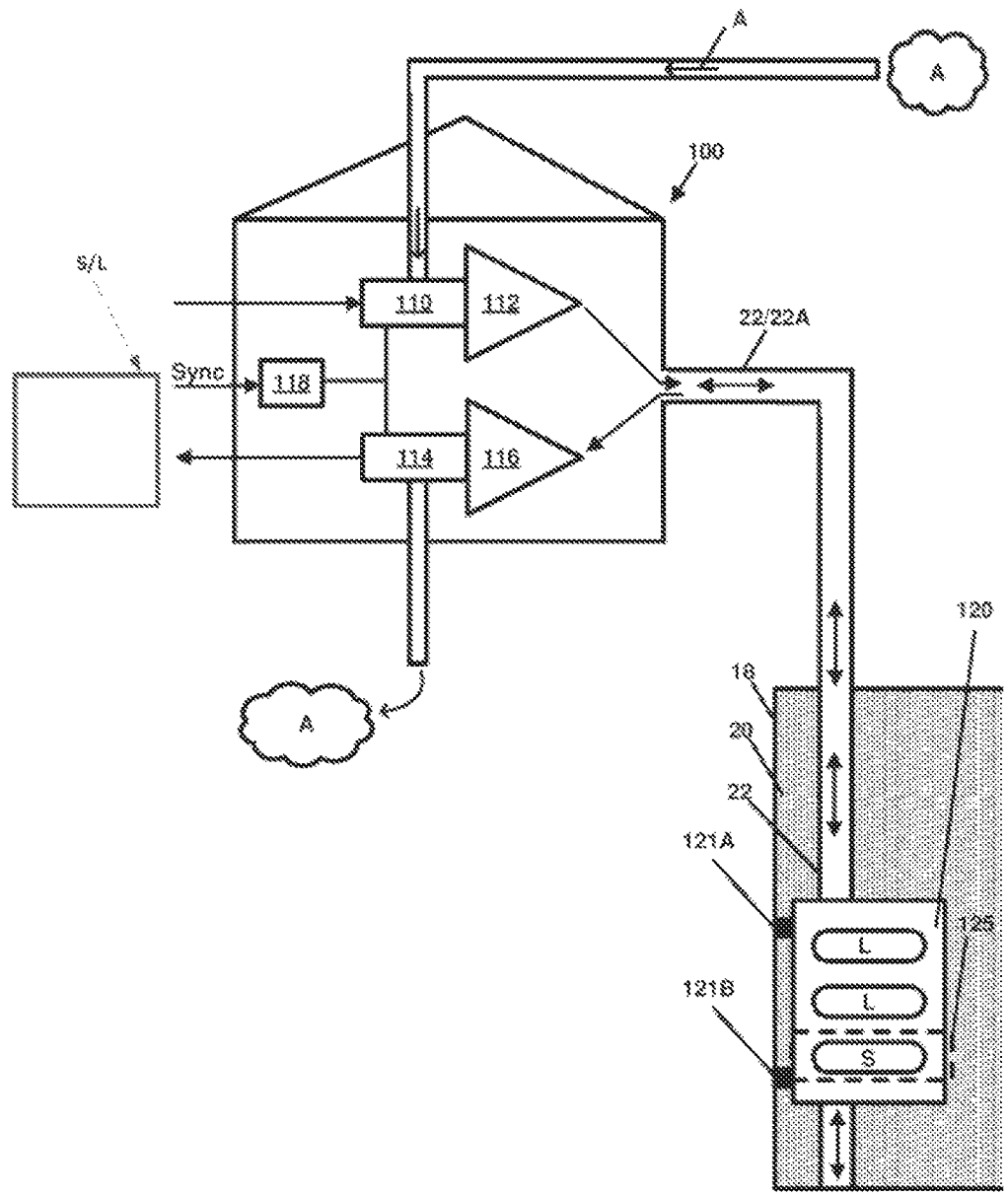
FIG. 8 is a schematic view of components of a compressor/expander subsystem for the compressed gas energy storage system, according to an embodiment.

Referring to FIG. 8, optionally, an insulating "jacket" 125 (shown in dotted lines to not occlude portions of the thermal storage subsystem 120) can be wrapped around an portion of thermal storage subsystem 120 to provide some of thermal insulation between the liquid 20 in shaft 18 and the thermal storage subsystem 120 thereby to promote rapid heat stratification, which may help increase the performance of a PCM heat storage system. As described above, air A from the ambient entering compressor/expander subsystem 100 can be conditioned to become air A' prior to its entry to the compressor 112 by passing the air through thermal storage subsystem 120 thereby to cause the air A' to be at a temperature suited for an efficient operating range of a particular stage of compressor 112.

Figure 9:
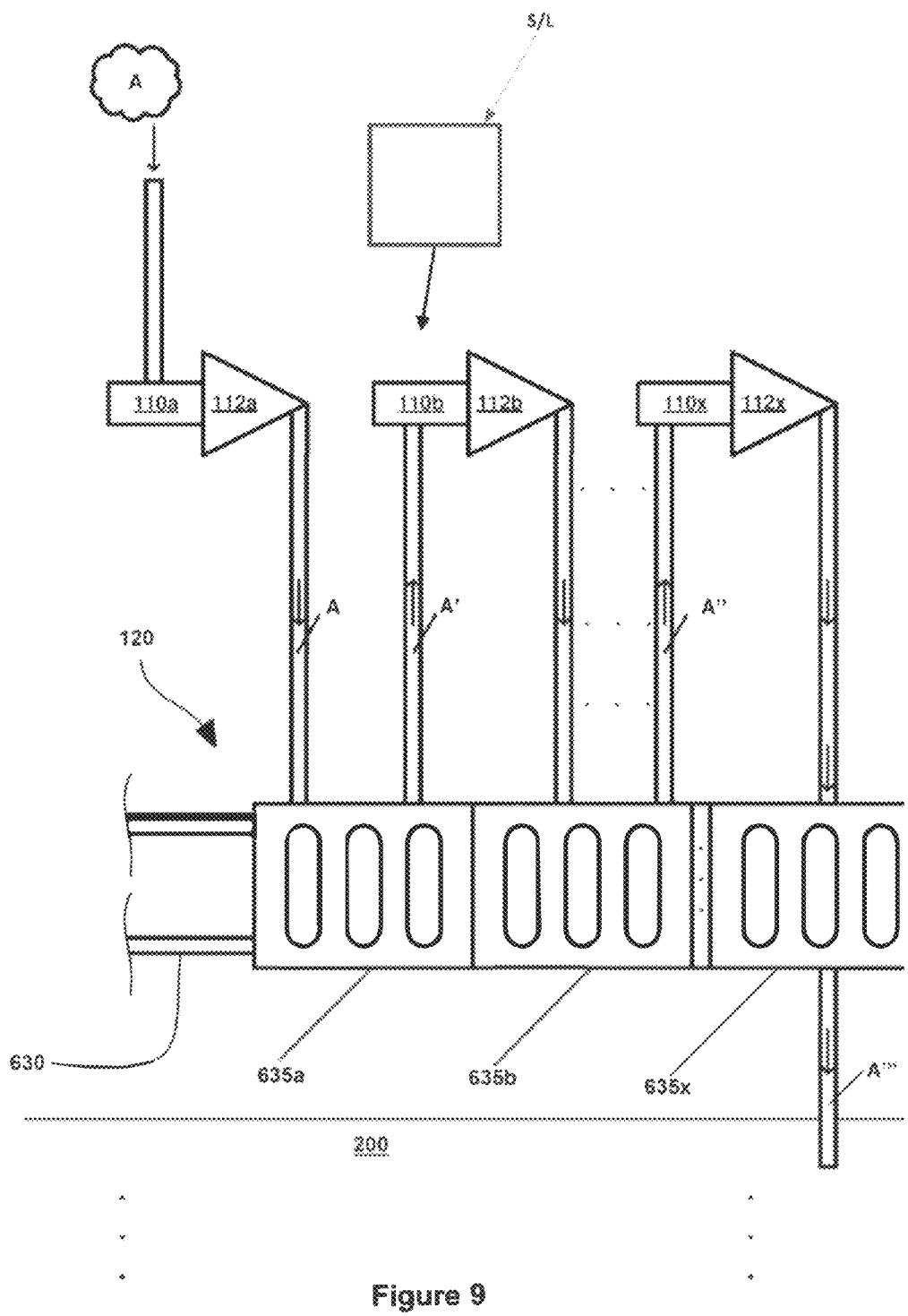
FIG. 9 is a schematic view of components of an alternative compressor/expander subsystem for a compressed gas energy storage system, with multiple compression stages each associated with a respective stage of a thermal storage subsystem.

Optionally, the controller 118 may also be configured to change the condition of the thermal storage subsystem 120 so as to change the nature of the heat being exchanged between air coming through the thermal storage subsystem 120 into the compressor 112 and the thermal storage material in the thermal storage subsystem 120, or to change routing of air to the compressor 112 so that it is not passing through thermal storage subsystem 120. FIG. 9 is a schematic view of components of an alternative compressor/expander subsystem 100 for a compressed gas energy storage system 10, with multiple compression stages and each is associated with a respective heat exchanger of a thermal storage subsystem 120. In particular, when operating in charging mode, incoming air from the ambient A is conveyed first, optionally via a heat exchanger to modify the temperature of the incoming air, into compressor 112a driven by motor 110a for a first stage of compression. In this example, the thermal storage subsystem 120 may include two or more heat exchangers 635 that can be provided between the different compression stages. Following the first stage of compression, air A is then conveyed through a first heat exchanger 635a of a thermal storage subsystem 120 to transfer heat from the air A into the thermal storage liquid 600, thereby to be conditioned to be air A' which is then conveyed into compressor 112b driven by motor 110b for a second stage of compression. Following the second stage of compression, air A' is then conveyed through any additional heat exchangers of the thermal storage subsystem 120 such as second heat exchanger 635b of thermal storage subsystem 120 to transfer heat from the air A" into the thermal storage liquid 600. A last heat exchanger of the thermal storage subsystem 120 is represented in this example as heat exchanger 635x transfer heats from the air A''' into the thermal storage liquid 600. Following this $x^{th}$ stage of compression and thermal storage, the air A''' is conveyed down into accumulator 12 as has been described above with respect to other embodiments. Optionally, the heat stored in the thermal storage subsystem 120 in the charging mode may be stored entirely for re-incorporating into air being released when the compressed gas energy storage is operated in a discharging mode, but may in some capacity or quantity be employed for some other purposes of the compressed gas energy storage system such as for helping to regulate temperature of another subsystem, or to operate pneumatic tools and instruments, amongst other uses. It should be noted that, while three stages of compression with respective thermal storage stages are shown in FIG. 6, a compressed gas energy storage system according to this embodiment of the invention may have only two, or more than three stages of compression with respective thermal storage stages. Furthermore, in alternative embodiments a given stage of compression is not necessarily always followed by a stage of thermal storage. Furthermore, in alternative embodiments, incoming air that has not yet been compressed in the compressed gas energy storage system may first pass through a thermal storage subsystem or stage thereof to reduce or increase its heat content prior to entering a compressor, rather than a heat exchanger that might dissipate the heat from the system.

Figure 10:
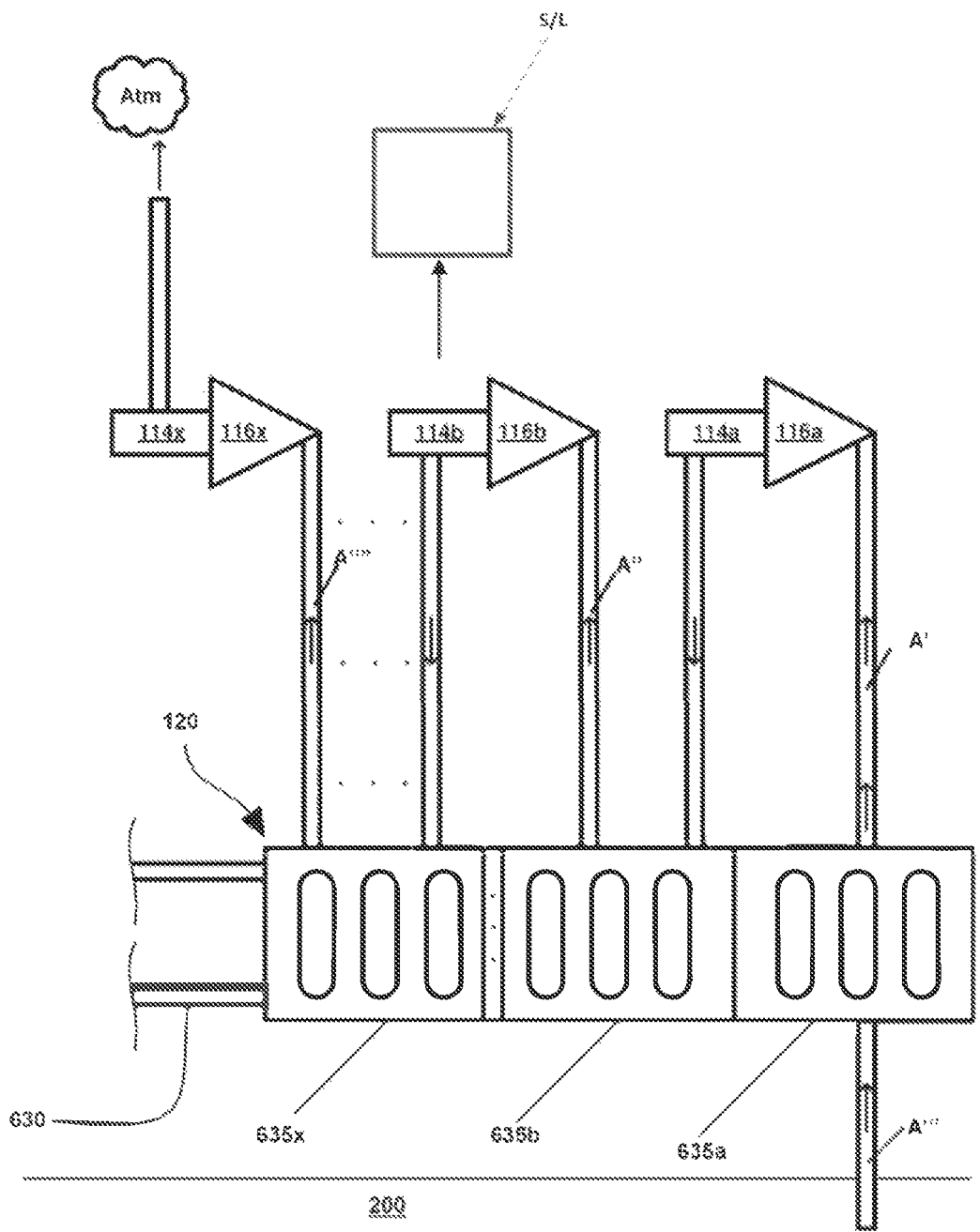
FIG. 10 is a schematic view of components of an alternative compressor/expander subsystem for a compressed gas energy storage system, with multiple expansion stages each associated with a respective stage of a thermal storage subsystem.

FIG. 10 is a schematic view of components of an alternative compressor/expander subsystem for a compressed gas energy storage system, with multiple expansion stages each associated with a respective heat exchanger of a thermal storage subsystem 120. In particular, during an expansion (release) phase, compressed air A released from accumulator 12 is first conveyed through a first exchanger 635a of a thermal storage subsystem 120 to transfer heat from the thermal storage liquid 600 into the air being conveyed thereby to be conditioned as air A'. Air A' is presented to a first expander 116a driving a generator 114a for a first stage of expansion. Following the first stage of expansion, air A' is then conveyed through a second exchanger 635b to transfer stored heat from the thermal storage liquid 600 into the air being conveyed thereby to be conditioned to be air A", which is then conveyed into expander 116b driving generator 114b for a second stage of expansion. Following the second stage of expansion, air A" is then conveyed through any additional stages of the thermal storage subsystem 120. A last exchanger of the thermal storage subsystem 120 is represented in this example as exchanger 635x which transfers stored heat into compressed air being conveyed through expansion stage 635x thereby to be conditioned to be air A'''. Following this $x^{th}$ stage of expansion and heat release from thermal storage, the air A''' is conveyed to the ambient atmosphere A as has been described above with respect to other embodiments. The heat stored in the thermal storage subsystem 120 may have been stored from incoming air being compressed during a storage phase of the compressed gas energy storage system, but alternatively or in some combination may have been stored during operation of another aspect or subsystem of the compressed gas energy storage system, such as during temperature regulation of another subsystem, or during an electrical heating process. It should be noted that, while three stages of expansion with respective thermal storage stages are shown in FIG. 10, a compressed gas energy storage system according to this embodiment of the invention may have only two, or more than three stages of expansion with respective thermal storage stages. Furthermore, in alternative embodiments a given stage of expansion is not necessarily always preceded in the processing chain by a stage of release of heat from thermal storage.

Figure 11:
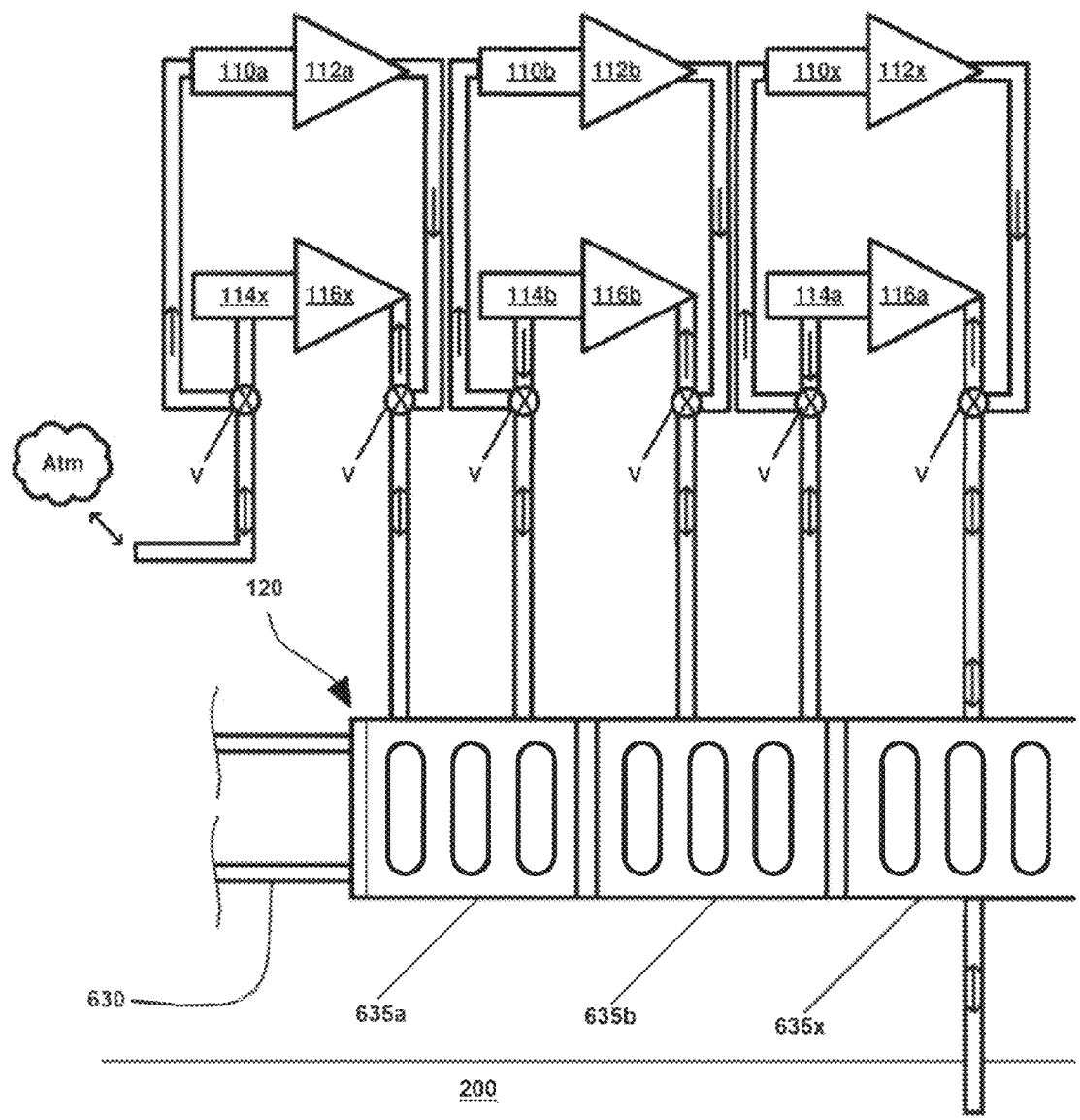
FIG. 11 is a schematic view of components of an alternative compressor/expander subsystem for a compressed gas energy storage system, with pairs of compression and expansion stages each associated with a respective stage of a thermal storage subsystem.

FIG. 11 is a schematic view of components of an alternative compressor/expander subsystem for a compressed gas energy storage system, with pairs of compression and expansion stages each associated with a respective exchanger of the thermal storage subsystem 120. In this embodiment, a given exchanger of the thermal storage subsystem 120 is used during both the compression and expansion stages, by routing air being conveyed into the accumulator 12 through the thermal storage subsystem 120 to remove heat from the air either prior to a subsequent stage of compression or prior to storage, and routing air being conveyed out of accumulator 12 through the thermal storage subsystem 120 to add heat to the air either after release from accumulator or after a stage of expansion. In a sense, therefore, pairs of compression and expansion stages share a heat exchanger 635a, 635b and 635x and airflow is controlled using valves V, as shown in the Figure. This embodiment may be useful where the "same" heat stored from compressed air being conveyed towards the accumulator 12 during a storage phase is to be released into the air being released from the accumulator 12 during a release phase.

Figure 12:
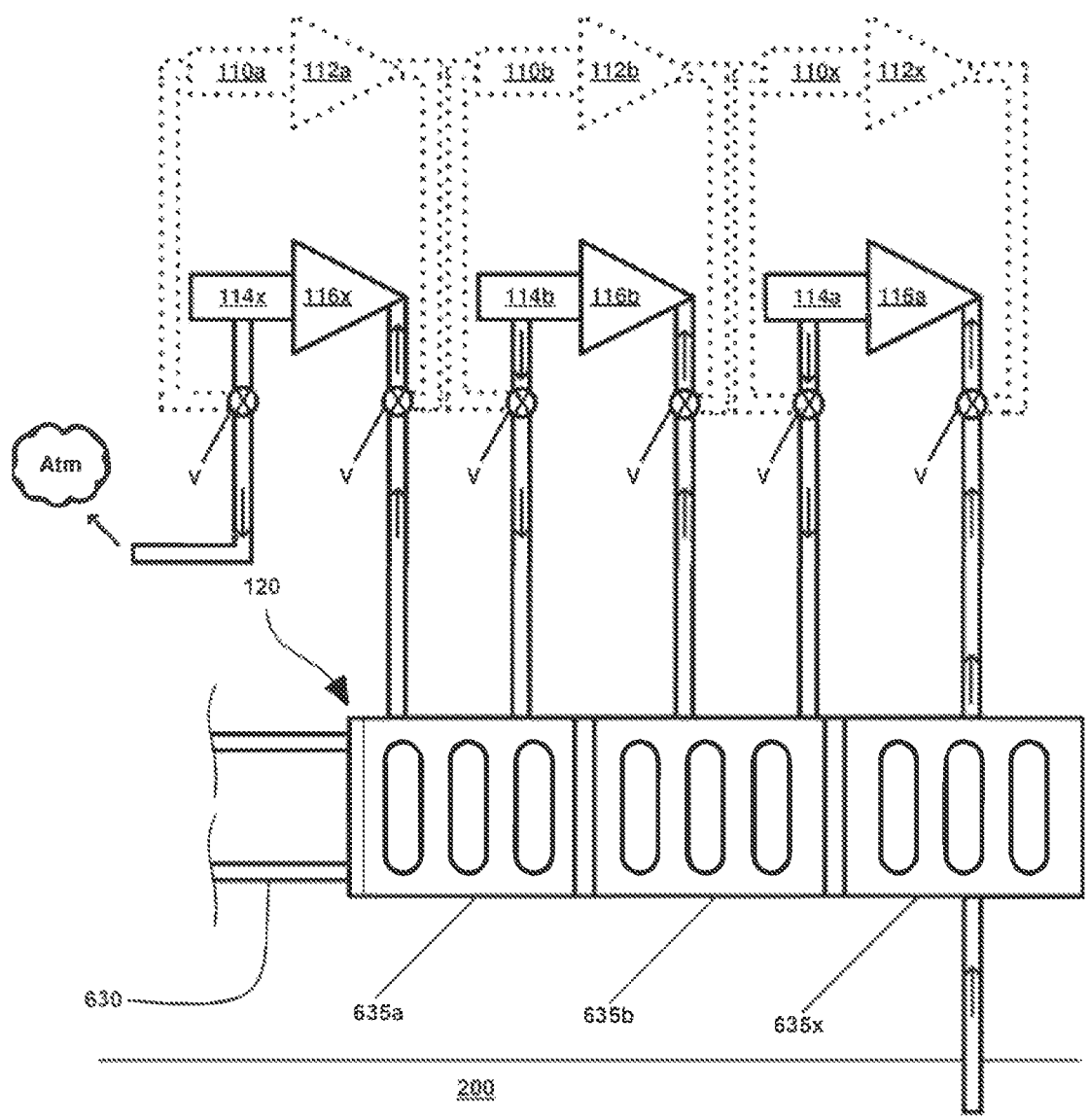
FIG. 12 is a schematic view of components of the alternative compressor/expander subsystem of FIG. 11, showing airflow during an expansion (release) phase from storage through multiple expanders and respective stages of a thermal storage subsystem.

FIG. 12 is a schematic view of components of the alternative compressor/expander subsystem of FIG. 11, showing airflow during an expansion (release) phase from storage through multiple expander stages and multiple respective heat exchangers of the thermal storage subsystem 120. In this phase, through control of valves V, airflow is directed through multiple expansion stages in a manner similar to that shown in FIG. 10. The dashed lines show multiple compression stages the airflow to which is prevented during an expansion phase by the control of valves V.

Figure 13:
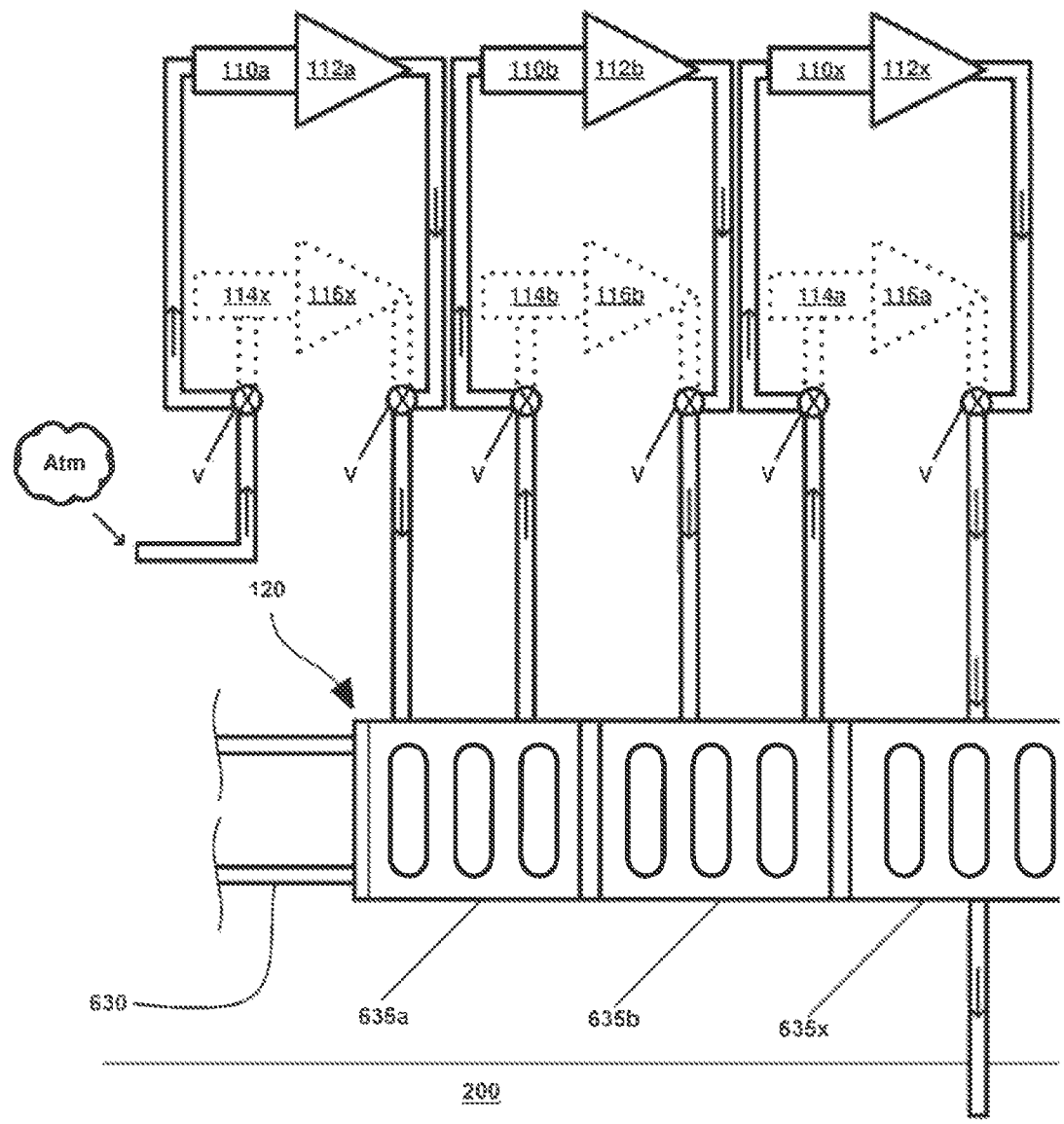
FIG. 13 is a schematic view of components of the alternative compressor/expander subsystem of FIG. 11, showing airflow during a compression (storage) from the ambient through multiple compressors and respective stages of a thermal storage subsystem.

FIG. 13 is a schematic view of components of the alternative compressor/expander subsystem of FIG. 11, showing airflow during a compression (storage) phase from the ambient A through multiple compressor stages and multiple respective heat exchangers of the thermal storage subsystem 120. In this phase, through control of valves V, airflow is directed through multiple compression stages in a manner similar to that shown in FIGS. 1 and 12. The dashed lines show multiple expansion stages the airflow to which is prevented during the compression phase by the control of valves V.

Figure 14:
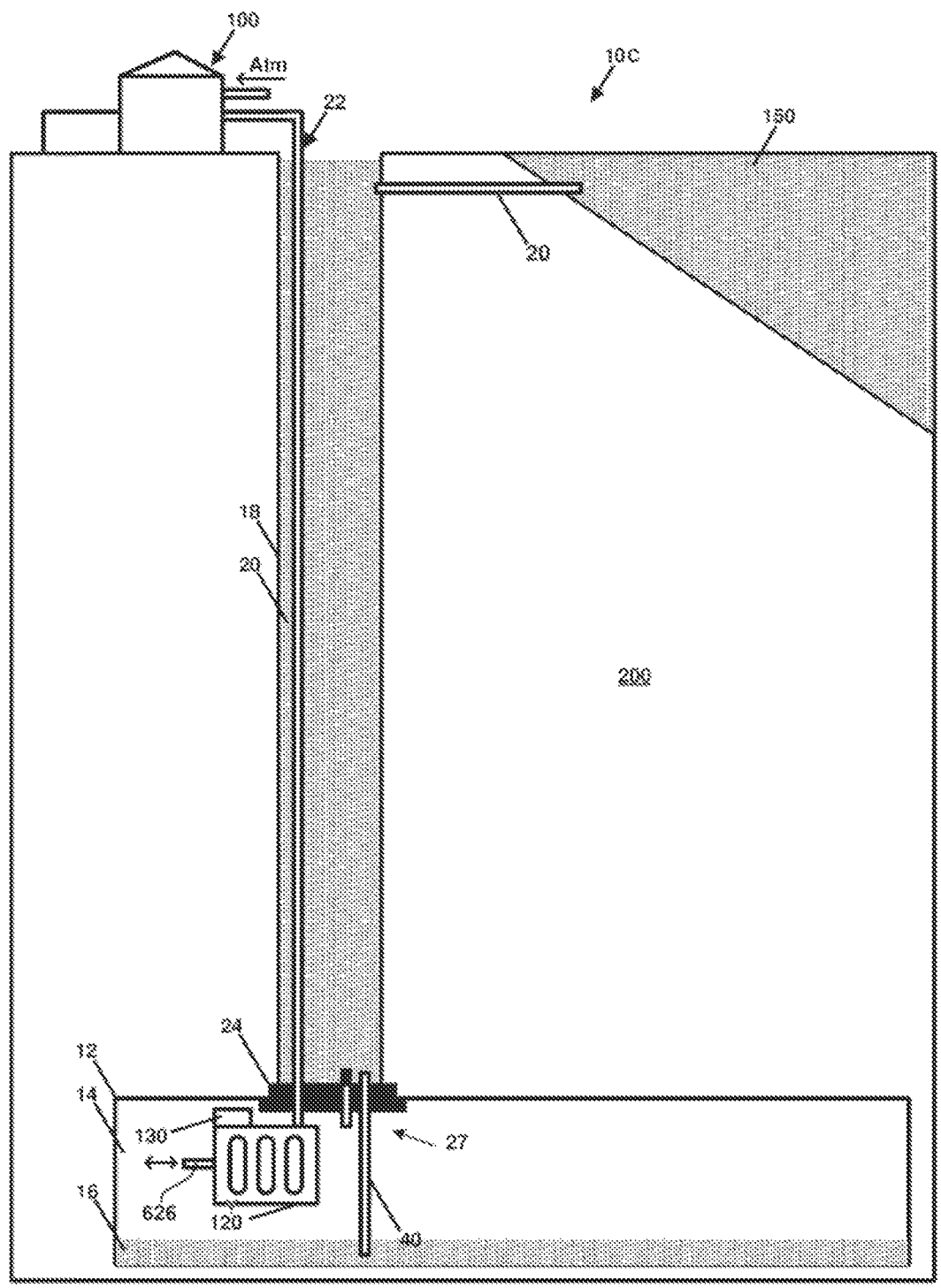
FIG. 14 is a sectional view of components of a compressed gas energy storage system, according to an alternative embodiment.

FIG. 14 is a sectional view of components of an alternative compressed gas energy storage system 10C, according to an embodiment. In this embodiment, compressed gas energy storage system 10C is similar to the other embodiments of the compressed gas energy storage systems described herein. However, in this embodiment the thermal storage subsystem 120 (including any of the suitable variations described herein, including a storage reservoir 610, source reservoir 606 and related equipment) is located within the accumulator 12 and may be at least partially immersed within the compressed gas in compressed gas layer 14. The thermal storage subsystem 120 may be positioned within the accumulator 12 during construction via the opening 27 that is thereafter blocked with bulkhead 24 prior to filling shaft 18 with liquid 20. The thermal storage subsystem 120 can thus be designed to allow for the construction, insulation, etc. to be completed prior to placement within the accumulator 12 and/or is constructed in easily-assembled components within the accumulator 12. This allows for the units to be highly insulated and quality-controlled in their construction, which enables the thermal storage subsystem 120 to be generally independent of the accumulator 12, with the exception of an anchoring support (not shown).

Optionally, a regulating valve 130 associated with the interior of thermal storage subsystem 120 may be provided and configured to open should the pressure within the thermal storage subsystem 120 become greater than the designed pressure-differential between its interior and the pressure of the compressed gas layer 14 in the surrounding accumulator 12. Pressure within the thermal storage subsystem 120 may be maintained at a particular level for preferred operation of the latent or sensible material. For example, heated water as a sensible material may be maintained at a particular pressure to maintain the thermal fluid in its liquid state at the storage temperature. The regulating valve 130 may open to allow the pressurized gas in the interior to escape to the accumulator 12 and can close once the pressure differential is lowered enough to reach a designated level. In an alternative embodiment, such a regulating valve may provide fluid communication between the interior of the thermal storage subsystem 120 and the ambient A at the surface thereby to allow gas to escape to the ambient rather than into the accumulator 12. While thermal storage subsystem 120 is shown entirely immersed in the compressed gas layer 14, alternative thermal storage subsystems 120 may be configured to be immersed partly or entirely within liquid layer 16. In some examples, only a portion of the thermal storage subsystem 120, such as the storage reservoir 610, may be at least partially nested within the accumulator 12, and other portions, such as the heat exchangers and the source reservoir 606, may be spaced apart from the accumulator 12.

Figure 15:
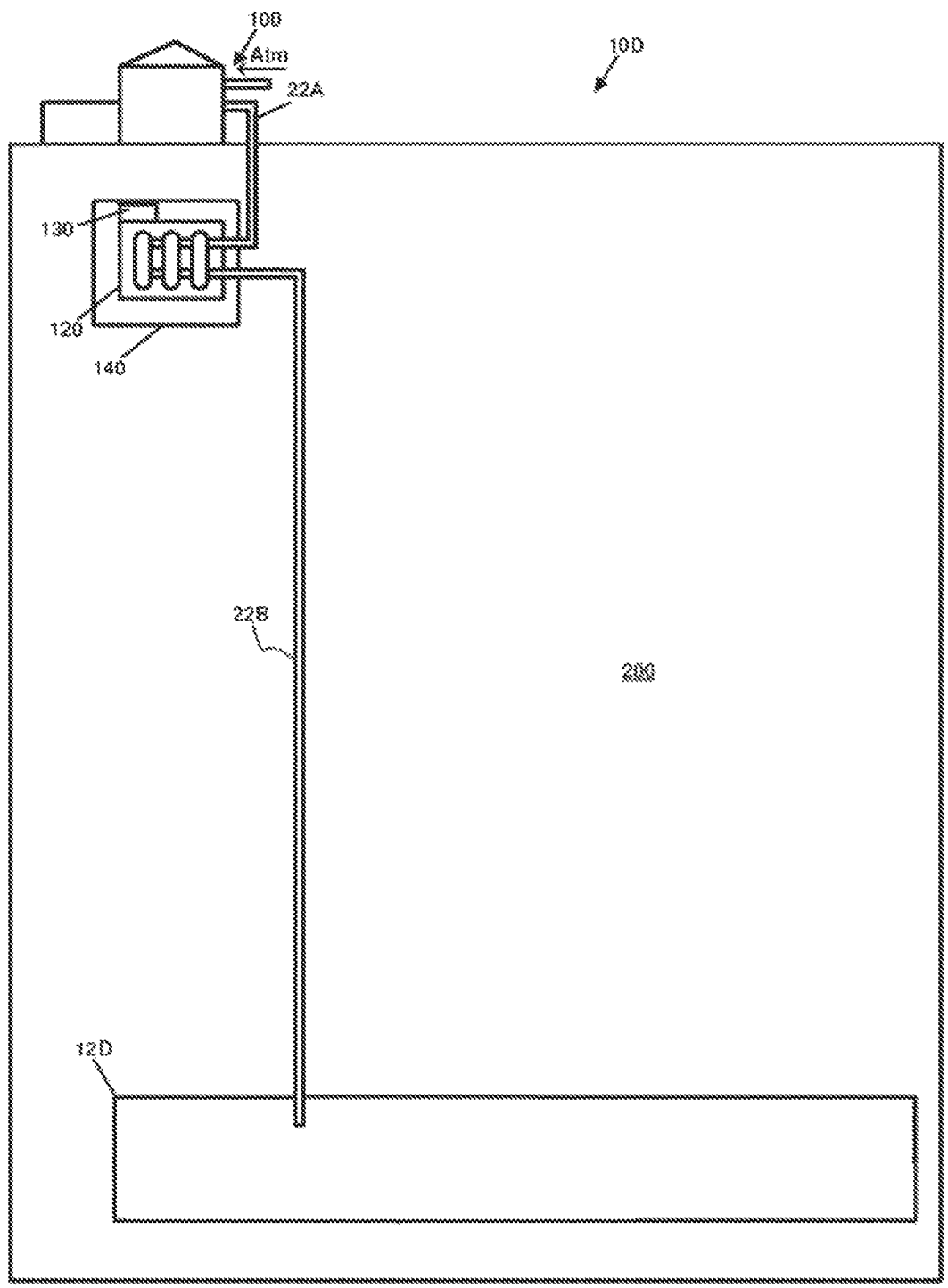
FIG. 15 is a sectional view of components of an alternative compressed gas energy storage system, according to another alternative embodiment.

FIG. 15 is a sectional view of components of an alternative compressed gas energy storage system 10D, according to another alternative embodiment. In this embodiment, the compressed energy gas storage system 10D includes a different type of accumulator 12D that is not hydrostatically compensated, and may be a salt cavern, an existing geological formation, or manmade. That is, the accumulator 12D is configured to contain compressed gas but need not include a liquid layer or be associated with a shaft containing water. This is another type of accumulator that may, in some embodiments, be used in place of the accumulators 12 used with respect to other embodiments of the compressed gas energy storage systems described herein. Aspects of the thermal storage subsystems 120 described in this embodiment may be used in combination with the hydrostatically compensated compressed gas energy storage systems described, and aspects of the thermal storage subsystems 120 depicted in other embodiments may be utilized with accumulators similar to accumulator 12D. In this embodiment, compressed gas energy storage system 10D is similar to above-described compressed gas energy storage systems. However, the thermal storage subsystem 120 is located within an isobaric pressurized chamber 140 within ground 200 that may be maintained at the same pressure as is accumulator 12, or a pressure that is substantially similar to the accumulator pressure or optionally at a pressure that is less than or greater than the accumulator pressure. Optionally, the thermal storage subsystem 120 may be positioned within the pressurized chamber 140 during construction via an opening that is thereafter blocked so the chamber 140 may be pressurized to a working pressure that is, preferably, greater than atmospheric pressure. The thermal storage subsystem 120 can thus be designed to allow for the construction, insulation, etc. to be completed prior to placement within the chamber 140 and/or is constructed in easily-assembled components within the chamber 140. This allows for the units to be highly insulated and quality-controlled in their construction, which enables the thermal storage subsystem 120 to be generally independent of the chamber 140, with the exception of anchoring support (not shown). A regulating valve 130 associated with the interior of thermal storage subsystem 120 is provided and configured to open should the pressure within the thermal storage subsystem 120 become greater than the designed pressure-differential between the interior and the surrounding pressurized chamber 140. Pressure within the thermal storage subsystem 120 may be required to be maintained at a particular level for optimal operation of the latent or sensible material. For example, heated water as a sensible material may be required to be maintained at a particular pressure to maintain the thermal fluid in its liquid state at the storage temperature. The regulating valve 130 opens to allow the pressurized gas in the interior to escape to the pressurized chamber 140 and closes once the pressure differential is lowered enough to reach a designated level. In an alternative embodiment, such a regulating valve 130 may provide fluid communication between the interior of the thermal storage subsystem 120 and the ambient A at the surface thereby to allow gas to escape to the ambient rather than into the pressurized chamber 140.

Locating the thermal storage subsystem 120 above the accumulator 12, and thus physically closer to the compression/expansion subsystem 100, may help reduce the length of piping required, which may help reduce the costs of piping, installation and maintenance, as well as reduced fluid-transfer power requirements.

While the embodiment of compressed gas energy storage system 10D includes an isobaric pressurized chamber 140, alternatives are possible in which the chamber 140 is not strictly isobaric. Furthermore, in alternative embodiments the pressurized chamber 140 may be in fluid communication with gas layer 14 and thus can serve as a storage area for compressed gas being compressed by compressor/expander subsystem 100 along with accumulator 12. In this way, the pressure of the gas in which the thermal storage subsystem 120 is immersed can be maintained through the same expansions and compressions of gas being conveyed to and from the accumulator 12.

Optionally, any of the thermal storage subsystems 120 described herein may include a thermal conditioning system that can be used to regulate the temperature of the layer of cover gas 602 in the storage reservoir 610 and/or in the source reservoir 606. For example, the thermal conditioning system may include a fan cooler, heat exchanger, evaporator coils or other such equipment so that it can be used to optionally reduce (or alternatively increase) the temperature of the layer of cover gas 602 when the thermal storage subsystem 120 is in use.

We claim:

1. A compressed gas energy storage system comprising:
a) an accumulator having an interior configured to contain compressed gas when in use, wherein the accumulator has a primary opening, an upper wall, a lower wall and the accumulator interior containing a compressed gas being at least partially bounded by the upper wall and lower wall;
b) a gas compressor/expander subsystem spaced apart from the accumulator and comprising at least a first compression stage having a gas inlet and a gas outlet in fluid communication with the accumulator interior via a gas conduit for conveying compressed gas to the accumulator when in a charging mode and from the accumulator when in a discharging mode; and
c) a thermal storage subsystem comprising:
 i. at least a first storage reservoir configured to contain a thermal storage liquid at a storage pressure that is greater than atmospheric pressure, wherein the first storage reservoir comprises a pressurized layer of cover gas above the thermal storage liquid and the layer of cover gas is formed by a boiling of a portion of the thermal storage liquid within the first storage reservoir whereby the layer of cover gas is pressurized to the storage pressure;

ii. a liquid passage having an inlet connectable to a thermal storage liquid source and configured to convey the thermal storage liquid to the first storage reservoir; and iii. a first heat exchanger provided in the liquid passage and in fluid communication between the first compression stage and the accumulator, whereby when the compressed gas energy storage system is in a charging mode thermal energy is transferred from a compressed gas stream exiting the gas compressor/expander subsystem to the thermal storage liquid.

2. The compressed gas energy storage system of claim 1, wherein the thermal storage liquid is heated to a storage temperature prior to entering the first storage reservoir, wherein the storage temperature is below a boiling temperature of the thermal storage liquid when at the storage pressure and is above the boiling temperature of the thermal storage liquid when at atmospheric pressure.

3. The compressed gas energy storage system of claim 2, wherein the storage temperature is between about 150 degrees Celsius and about 350 degrees Celsius.

4. The compressed gas energy storage system of claim 1, wherein the compressed gas within the accumulator is at an accumulator pressure, and wherein the storage pressure is less than the accumulator pressure.

5. The compressed gas energy storage system of claim 1, wherein the first storage reservoir is at least partially disposed within the accumulator.

6. The compressed gas energy storage system of claim 1, wherein the thermal storage liquid source comprises a source reservoir containing a quantity of the thermal storage liquid at a source temperature that is less than a storage temperature.

7. The compressed gas energy storage system of claim 6, wherein the source reservoir is external the first storage reservoir.

8. The compressed gas energy storage system of claim 1, wherein the gas compressor/expander subsystem comprises a second compression stage downstream from the first compression stage and the first heat exchanger is fluid communication between the first compression stage and the second compression stage, and the thermal storage subsystem further comprises a second heat exchanger in fluid communication between the second compression stage and the accumulator, whereby thermal energy is transferred between the compressed gas stream exiting the second compression stage and the thermal storage liquid.

9. The compressed gas energy storage system of claim 8, wherein the gas compressor/expander subsystem comprises a third compression stage downstream from the second compression stage and the second heat exchanger is fluid communication between the second compression stage and the third compression stage, and the thermal storage subsystem further comprises a third heat exchanger in fluid communication between the third compression stage and the accumulator, whereby the thermal energy is transferred between the compressed gas stream exiting the third compression stage and the thermal storage liquid.

10. The compressed gas energy storage system of claim 1, wherein the first storage reservoir comprises a single chamber having a chamber bottom wall, a chamber top wall, a chamber sidewall extending therefrom and defining a chamber interior configure to contain the thermal storage liquid.

11. The compressed gas energy storage system of claim 10, wherein the single chamber includes a natural underground cavity formed at least partially of natural rock.

12. The compressed gas energy storage system of claim 11, further comprising a storage liner covering at least a portion of an interior surface of the chamber.

13. The compressed gas energy storage system of claim 1, further comprising an extraction pump in liquid communication with the thermal storage liquid in the first storage reservoir and selectably operable to pump the thermal storage liquid at a storage temperature out of the first storage reservoir, and wherein when an exit stream of gas is released from the accumulator, thermal energy is transferred from the thermal storage liquid pumped out of the first storage reservoir into the exit stream of gas.

14. The compressed gas energy storage system of claim 13, wherein the exit stream of gas and the thermal storage liquid pumped out of the first storage reservoir pass through the first heat exchanger.

15. The compressed gas energy storage system of claim 1, wherein the first storage reservoir is disposed entirely under ground.

16. The compressed gas energy storage system of claim 1, further comprising a reservoir cooling system for selectably cooling a temperature of the thermal storage liquid contained in the first storage reservoir, thereby reducing the storage pressure within the first storage reservoir.

17. The compressed gas energy storage system of claim 1, wherein when the compressed gas energy storage system is in the discharging mode, compressed gas travels from the accumulator to the gas compressor/expander subsystem and at least a portion of the thermal storage liquid at a storage temperature is withdrawn from the first storage reservoir and the thermal storage subsystem is operable so that thermal energy is transferred from at least the portion of the thermal storage liquid withdrawn from the first storage reservoir to the compressed gas exiting the accumulator whereby a temperature of the compressed gas exiting the accumulator is increased before it reaches the gas compressor/expander subsystem.

18. The compressed gas energy storage system of claim 17, wherein when the compressed gas energy storage system is in the discharging mode the compressed gas traveling from the accumulator to the gas compressor/expander subsystem passes through the first heat exchanger to receive the thermal energy from the thermal storage liquid.

19. The compressed gas energy storage system of claim 1, wherein the first storage reservoir is configured as an aboveground vessel.

* * * * *